US008421622B2

(12) United States Patent
Tsujita et al.

(10) Patent No.: US 8,421,622 B2
(45) Date of Patent: Apr. 16, 2013

(54) MONITORING SYSTEM FOR MOVING OBJECT

(75) Inventors: Wataru Tsujita, Tokyo (JP); Kenji Inomata, Tokyo (JP); Yoshio Sato, Tokyo (JP); Atsuhisa Nakanishi, Tokyo (JP); Hajime Nakajima, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 532 days.

(21) Appl. No.: 12/829,556

(22) Filed: Jul. 2, 2010

(65) Prior Publication Data
US 2011/0163887 A1 Jul. 7, 2011

(30) Foreign Application Priority Data

Jan. 6, 2010 (JP) ................................. 2010-001274

(51) Int. Cl.
G08B 13/00 (2006.01)
(52) U.S. Cl.
USPC .......................... 340/541; 340/686.1; 340/552
(58) Field of Classification Search .................. 340/552, 340/553, 561, 565, 567, 568.2, 541, 545.3, 340/686.6
See application file for complete search history.

(56) References Cited

U.S. PATENT DOCUMENTS

| 6,424,289 B2 | 7/2002 | Fukae et al. |
| 7,576,648 B2 | 8/2009 | Harman |

FOREIGN PATENT DOCUMENTS

| JP | 10-095338 A | 4/1998 |
| JP | 2000-046935 A | 2/2000 |
| JP | 2004-306909 A | 11/2004 |
| JP | 2008-224324 A | 9/2008 |
| JP | 2009-053099 A | 3/2009 |

Primary Examiner — Daniel Wu
Assistant Examiner — Frederick Ott
(74) Attorney, Agent, or Firm — Buchanan Ingersoll & Rooney PC

(57) ABSTRACT

A monitoring system for a moving object including a leaking transmission device having a first and second leaking transmission paths extending substantially in parallel to each other, first equipment for transmitting a first transmission signal from one end side of both the ends of the leaking transmission device as a transmission medium to the other end side, second equipment for transmitting a second transmission signal from the other end side of both the ends of the leaking transmission device as the transmission medium to the one end side, and a detector for detecting a two-dimensional movement of a moving object as a monitoring target on the basis of a difference between variations of first and second reception signals based on the respective reflection waves of the first and second transmission signals from the moving object.

20 Claims, 19 Drawing Sheets

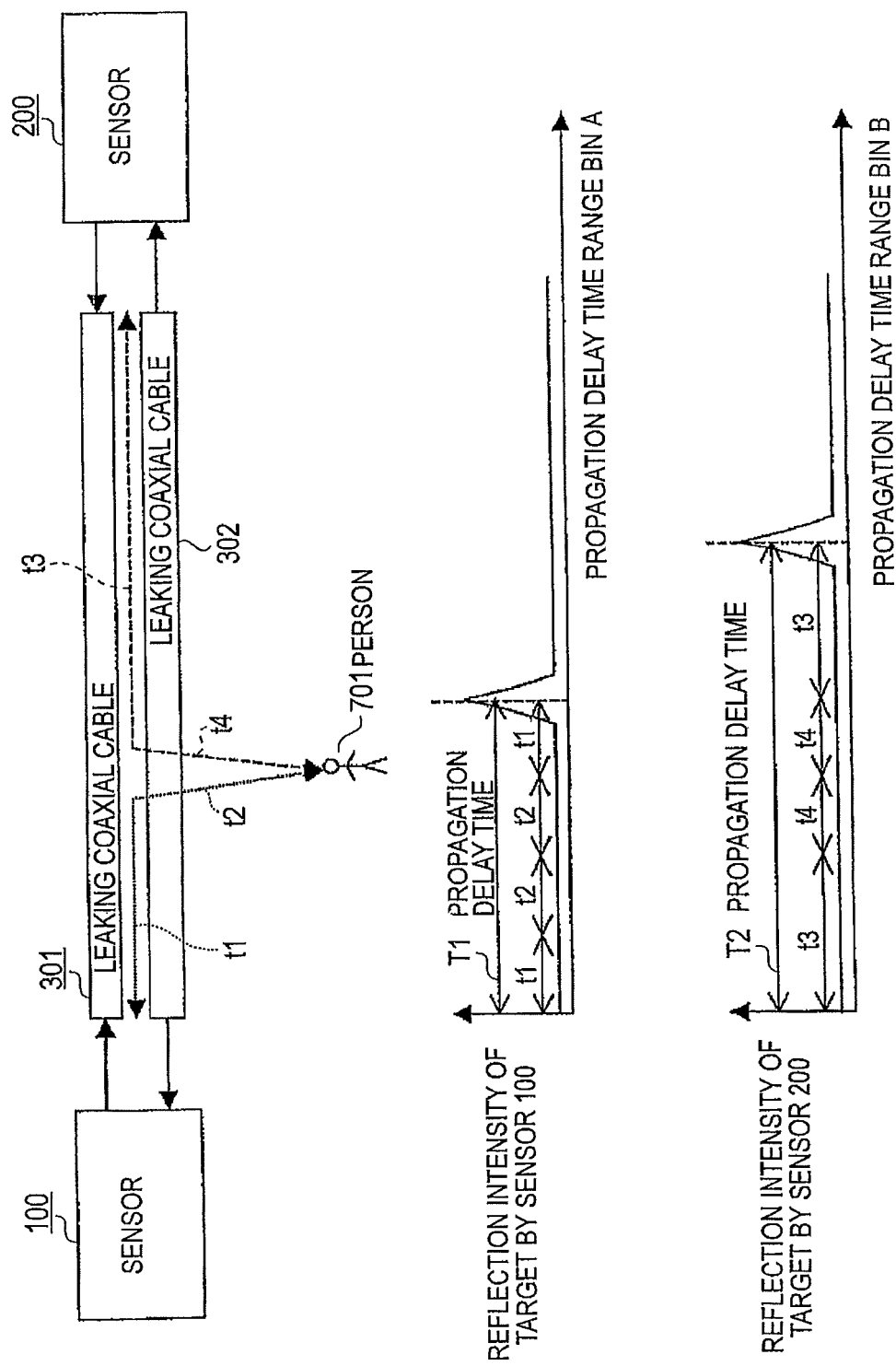

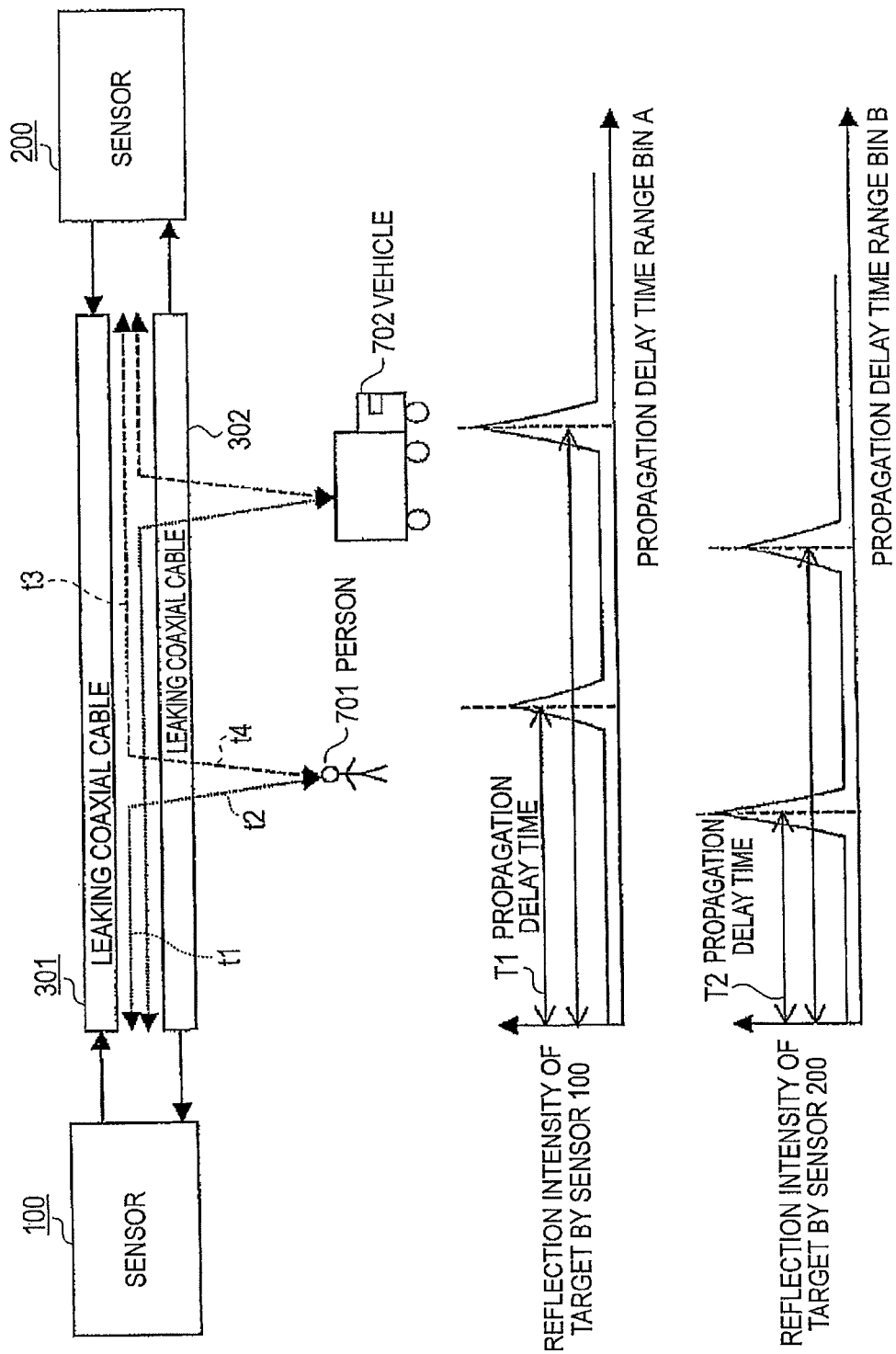

FIG.6A  AMPLITUDE PHASE OF SENSOR 100 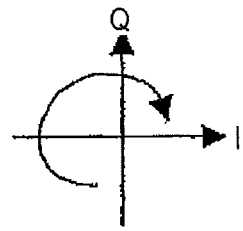
FIG.6B  AMPLITUDE PHASE OF SENSOR 100 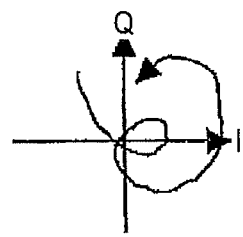
FIG.6C  AMPLITUDE PHASE OF SENSOR 200 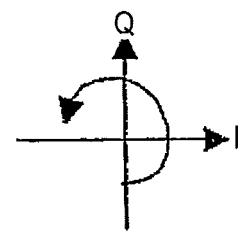
FIG.6D  AMPLITUDE PHASE OF SENSOR 200 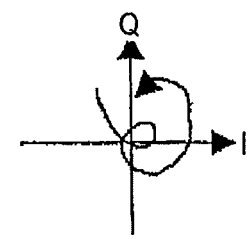

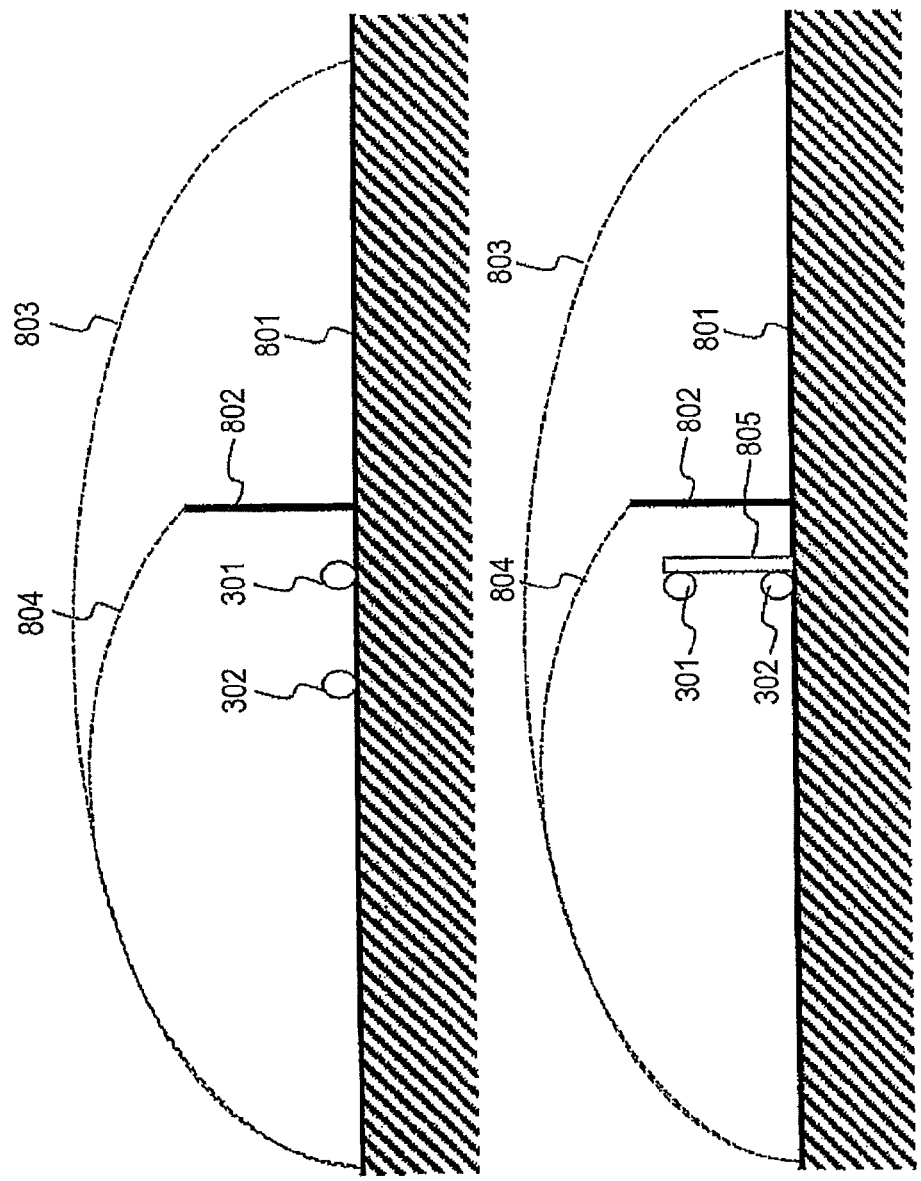

MONITORING SYSTEM FOR MOVING OBJECT

BACKGROUND OF THE INVENTION

1. Field of the Invention

The present invention relates to a moving object monitoring system for monitoring a moving object by using a leak transmission path such as a leaking cable or the like.

2. Description of the Related Art

According to a technique disclosed in JP-A-10-95338 (FIG. 1 and the description thereof), an electrical wave emitted from a transmission leaking cable is received by a reception leaking cable to monitor the level of this reception signal. When an object invades into the gap between the transmission and reception leaking cables, the electrical wave to be observed varies because it is delayed by the amount corresponding to the propagation delay time of an electrical wave reflected from the object, and thus the level of the reception signal is lowered. The level of the reception signal is determined on the basis of a predetermined threshold value at all times, and when the level of the reception signal is lower than the predetermined threshold value, an alarm for indicating existence of an invading object is output.

Furthermore, JP-A-2004-306909 (FIGS. 1 to 3 and the description thereof) discloses a system for detecting invasion of an object into the gap between leaking cables by using a spread spectrum signal.

In these systems, the distance in the perpendicular direction to the cable longitudinal direction of the leaking, that is, the separation distance cannot be measured, and thus an object which sufficiently reflects an electrical wave is detected although it is located far off. That is, these systems have a problem that the separation distance from the leaking cable cannot be used as a determination criterion.

The position of an object is calculated on the basis of only the propagation delay time from the emission of an electrical wave from the transmission leaking cable to reception of the electrical wave at the reception leaking cable, and thus the position of the object is calculated as a distance along the leaking axial cable. Accordingly, there is a problem that an alarm of "an invading object exists at a position on the leaking coaxial cable" is erroneously emitted because a large-size object such as a vehicle or the like moving in an extension direction (longitudinal direction) of the leaking cable at a position which is far away from the leaking coaxial cable in a direction perpendicular to the longitudinal direction (extension direction) of the leaking coaxial cable is detected.

Furthermore, even in the case of a small object, the reception level is greatly varied when it is very close to the leaking cable, and thus the small object is erroneously detected. That is, the size of the object cannot be used as a determination criterion for alarm.

SUMMARY OF THE INVENTION

The present invention has been implemented in view of the foregoing situation, and has an object to more surely monitor a moving object which is required to be monitored.

Furthermore, the present invention has another object to implement a moving object monitoring system for performing a monitoring operation so that a large-size object moving in an extension direction of a leaking cable at a position far away from a leaking coaxial cable in a direction perpendicular to the longitudinal direction (extension direction) of the leaking coaxial cable is not erroneously detected as an invading object.

According to the present invention, there is provided a monitoring system for a moving object including: a leaking transmission device having a first and second leaking transmission paths extending substantially in parallel to each other; first equipment for transmitting a first transmission signal from one end side of both the ends of the leaking transmission device as a transmission medium to the other end side; second equipment for transmitting a second transmission signal from the other end side of both the ends of the leaking transmission device as the transmission medium to the one end side; and a detector for detecting a two-dimensional movement of a moving object as a monitoring target on the basis of a difference between variation of a first reception signal and variation of a second reception signal, wherein the first transmission signal is radiated as a first electric wave from one of the first and second leaking transmission paths, the first electric wave is reflected from the moving object as the monitoring target to obtain a first reflection electric wave, and the first reflection electric wave is received through the leaking transmission device, thereby obtaining the first reception signal while the second transmission signal is radiated as a second electric wave from one of the first and second leaking transmission paths, the second electric wave is reflected from the moving object as the monitoring target to obtain a second reflection electric wave, and the second reflection electric wave is received through the leaking transmission device, thereby obtaining the second reception signal.

According to the monitoring system of the present invention, there are provided the leaking transmission device having the first and second leaking transmission paths extending substantially in parallel to each other, the first equipment for transmitting the first transmission signal from one end side of both the ends of the leaking transmission device as the transmission medium to the other end side, the second equipment for transmitting the second transmission signal from the other end side of both the ends of the leaking transmission device as the transmission medium to the one end side, and the detector for detecting the two-dimensional movement of the moving object as the monitoring target on the basis of the difference between variation of the first reception signal and variation of the second reception signal, wherein the first transmission signal is radiated as a first electric wave from one of the first and second leaking transmission paths, the first electric wave is reflected from the moving object as the monitoring target to obtain a first reflection electric wave, and the first reflection electric wave is received through the leaking transmission device, thereby obtaining the first reception signal while the second transmission signal is radiated as a second electric wave from one of the first and second leaking transmission paths, the second electric wave is reflected from the moving object as the monitoring target to obtain a second reflection electric wave, and the second reflection electric wave is received through the leaking transmission device, thereby obtaining the second reception signal. Accordingly, the moving object which is required to be monitored can be more surely monitored.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 3 is a diagram showing the relationship between a differential IQ data sequence and a propagation delay time when one object exists in the first embodiment of the present invention;

FIG. 4 is a diagram showing the relationship between a differential IQ signal sequence and a propagation delay time when two objects exist in the first embodiment of the present invention;

FIG. 6 is a diagram showing respective examples of IQ time data A of a first object and a second object observed by a first sensor, and IQ time data B of the first object and the second object observed by the second sensor in the first embodiment of the present invention;

FIG. 20 is a diagram showing a seventh embodiment, and shows an example of installation of a shielding plate.

DETAILED DESCRIPTION OF THE EMBODIMENTS

Embodiments according to the present invention will be described.

First Embodiment

Figure 1:
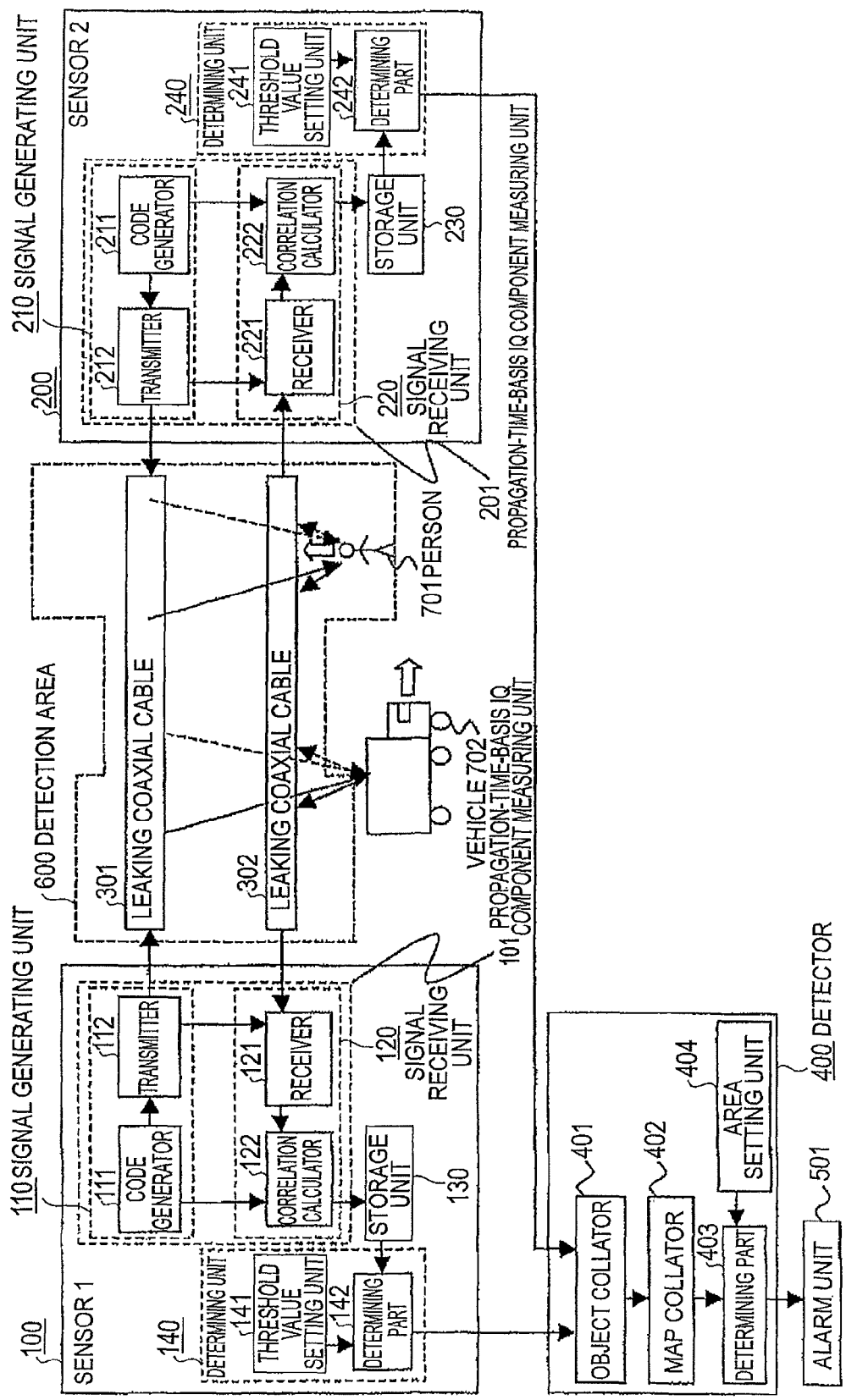
FIG. 1 is a block diagram showing an example of a system construction according to a first embodiment of the present invention.

A first embodiment according to the present invention will be described with reference to FIGS. 1 to 8. FIG. 1 is a block diagram showing an example of the system construction of an invasion detecting system as a representative example of a monitoring system for a moving object. In these figures, a moving object is described as a target.

As shown in FIG. 1, an invasion detecting system according to this embodiment includes first equipment (hereinafter referred to as "first sensor") 100, second equipment (hereinafter referred to as "second sensor") 200, a first leaking transmission path (hereinafter referred to as "first leaking coaxial cable") 301, a second leaking transmission path (hereinafter referred to as "second leaking coaxial cable" 302, a detector 400 and an alarm unit 501. The first leaking coaxial cable 301 and the second leaking coaxial cable 302 constitute a transmission device which is a signal transmission medium.

The first sensor 100 and the second sensor 200 are connected to both the ends of each of the first leaking coaxial cables 301 and 302. The first sensor 100 and the second sensor 200 are connected to the detector 400. The detector 400 is connected to the alarm unit 501.

The first sensor 100 has a propagation-time-basis IQ component measuring unit 101 comprising a signal generating unit 110 and a signal receiving unit 120, a storage unit 130 and a determining unit 140. The signal generating unit 110 has a code generator 111 and a transmitter 112. The signal receiving unit 120 has a receiver 121 and a correlation calculator 122. The determining unit 140 has a threshold setting part 141 and a determining part 142.

The second sensor 200 has a signal generating unit 210, a signal receiving unit 220, a storage unit 230 and a determining unit 240. The signal generating unit 210 has a code generator 211 and a transmitter 212. The signal receiving unit 220 has a receiver 221 and a correlation calculator 222. The determining unit 240 has a threshold setting unit 241 and a determining part 242.

The detector 400 has an object collator 401, a map collator 402, a determining part 403 and an area setting unit 404.

Next, the operation of the invasion detecting system will be described.

The first sensor 100 and the second sensor 200 detects existence or non-existence of an object, the detector 400 detects the position of the object and the alarm unit 501 emits an alarm in accordance with the position of the object. First, the operation of detecting existence or non-existence of the object by the first sensor 100 and the second sensor 200 will be described, and then the operation of detecting the position of the object by the detector 400 to determine whether an alarm should be emitted or not and then emitting the alarm by the alarm unit 501 will be described.

The first sensor 100 generates a spread spectrum signal by subjecting an oscillation signal described later as a carrier wave from the signal generating unit 110 to BPSK (Binary Phase Shift Keying) modulation using a code signal, and outputting the spread spectrum signal as a transmission signal to the first leaking coaxial cable 301. The spread spectrum signal is described in JP-A-2004-306909 or the like, and thus it is a well-known signal.

The first leaking coaxial cable 301 radiates the transmission signal as an electric wave to the space.

The second leaking coaxial cable 302 receives a direct wave of the electric wave which is radiated from the first leaking coaxial cable and directly incident to the second leaking coaxial cable 302, and a reflection wave of the electric wave which is radiated from the first leaking coaxial cable and reflected from the object, and outputs the received waves as a reception signal to the signal receiving unit 120.

The signal receiving unit 120 separates the reception signal every propagation delay time range bin having a preset time resolution by inverse spread spectrum processing, and outputs an IQ signal sequence comprising amplitude and phase to the storage unit 130. The IQ signal sequence is amplitude and phase information every range bin.

The foregoing operation is the operation of the propagation-time-basis IQ component measuring unit 101, and the propagation-time-basis IQ component measuring unit 101 measures the IQ signal of the amplitude and phase every propagation delay time from the output of the transmission signal from the signal generating unit 110 till the reception of the reception signal by the signal receiving unit 120.

The determining unit 140 determines that any object exists when the difference between the IQ signal sequence and a preset reference exceeds a predetermined threshold value.

The second sensor 200 executes the same operation as the first sensor 100.

In the signal transmitting unit 110 of the first sensor 100, the code generator 111 outputs a preset first code as a first code signal to the transmitter 112 and the correlation calculator 122 in the signal receiving unit 120.

The first code is constructed by a code sequence having a sharp autocorrelation characteristic to measure the propagation delay time. In order to prevent the first code and the second code from interfering with each other even when the first sensor 100 and the second sensor 200 have the same frequency band, the second code generated by the signal transmitting unit 210 of the second sensor 200 is constructed by a code sequence having low cross-correlation to the first code. The code sequence having this characteristic contains a well-known GOLD sequence, a well-known minimum cross-correlation M sequence or the like, for example.

The transmitter 112 subjects a preset first oscillation signal as a carrier wave to BPSK modulation using a code signal to obtain a spread spectrum signal, amplifies the spread spectrum signal to a predetermined level and outputs the amplified spread spectrum signal as a first transmission signal to the first leaking coaxial cable 301. The first oscillation signal is output to the receiver 121 in the signal receiving unit.

The first leaking coaxial cable 301 radiates the first transmission signal as an electric wave to the space. The second leaking coaxial cable 302 receives a direct wave of the electric wave which is radiated from the first leaking coaxial cable 301 and directly incident to the second leaking coaxial cable 302, and a reflection wave of the electric wave which is radiated from the first leaking coaxial cable 301 and reflected from an object, and outputs the received waves as a reception signal to the signal receiving unit 120 of the first sensor 100.

The characteristics of the first and second leaking coaxial cables will be described.

Each of the first and second leaking coaxial cables 301 and 302 has the structure that slots are periodically arranged and radiation directivity varies in accordance with the frequency of the signal. A slot pitch P, the wavelength $\lambda$ of an electric wave and a radiation angle $\theta$ satisfy the following expression.

$$\theta = \arcsin(-\sqrt{\in r} - n\lambda/P)$$

Here, $\in r$ represents the dielectric constant of the leaking coaxial cable, n represents negative integers of −1, −2, −3, .... For n=−1, it corresponds to the radiation angle of a fundamental wave, and for n=−2, it corresponds to the radiation angle of a second mode, etc.

The leaking coaxial cables contain a cable having a structure that a sub throttle is opened between slots, and it is provided to suppress a higher-order radiation mode. In this embodiment, only the fundamental wave is considered.

In the signal receiving unit 120 of the first sensor 100, the receiver 121 removes signals having unnecessary spectra from the reception signal passed through the second leaking coaxial cable 302 and incident to the receiver 121 by a filter, and then amplify the reception signal to a predetermined level. Then, IQ detection is executed on a base band signal with the first oscillation signal set as a reference signal, and the detection signal is output to the correlation calculator. The IQ detection is also called as orthogonal detection to divide the signal to an in-phase component I and a quadrature component Q with respect to the reference signal, and a base band component from which the carrier wave is removed.

The correlation calculator 122 calculates the cross-correlation between the delayed first code signal and the detection signal, separates the detection signal every propagation delay time range bin, and calculates the correlation value I corresponding to the I component and the correlation value Q corresponding to the Q component to obtain an IQ signal. The IQ signal of each propagation delay time range bin is output to the storage unit 130. The square root of the sum of squares between the correlation value I and the correlation value Q of each propagation delay time range bin corresponds to the amplitude of the reception signal which is separated every propagation delay time range bin, and the arctangent of the correlation value I and the correlation value Q corresponds to the phase.

When the first sensor 100 and the second sensor 200 are operated at the same time, the detection signal is constructed by the sum of the first code signal and the second code signal having various phase delay amounts. This phase delay amount corresponds to the propagation delay time. The first code signal has a sharp autocorrelation characteristic. Accordingly, even in the case of code sequences having the same pattern, the correlation function is equal to 1 when the phase difference is equal to zero, and thus these code sequences are non-correlated to each other even when the phase difference corresponds to only one-code displacement. According to this characteristic, by the cross-correlation calculation between the first code signal delayed by only the predetermined phase delay amount and the detection signal, the detection signal having the predetermined propagation delay time can be separated and picked up without being affected by the detection signal having a delay amount different from the predetermined phase delay amount.

Furthermore, the code sequences having low cross-correlation to each other are set to the first code signal and the second code signal. Therefore, even in the case of any phase difference, the first code signal and the second code signal are substantially non-correlated with each other. According to this characteristic, by calculating the cross-correlation between the delayed first code signal and the detection signal, the detection signal having the predetermined propagation delay time can be separated and picked up with being hardly affected by the second code signal.

A method using a discrete Fourier Transform is used as an example of the operation of the correlation calculator 122 for separating the detection signal from the cross-correlation calculation of the detection signal and the code signal every propagation delay time range bin. A complex signal in which the in-phase component and quadrature component of the detection signal of one period of the first code are set as a real part and an imaginary part is represented by x[n], and the first code output from the code generator 111 is represented by y[n]. When a signal of x[n] after discrete Fourier transform is represented by X[k], a signal of y[n] after discrete Fourier transform is represented by Y[k] and the number of samples of one period of the code signal is represented by N, the cross-correlation value rxy[m] of the code signal and the detection signal is calculated according to the following equations.

$$X[k]=DFT[x[n]]$$

$$Y[k]=DFT[y[n]]$$

$$rxy[m]=(1/N)IDFT[X[k]*\cdot Y[k]]$$

Here, X[k]* represents a complex conjugate of X[k], and X[k]*·Y[k] is called as a cross spectrum. DFT represents the discrete Fourier transform, and IDFT represents the discrete inverse Fourier transform. The real part of the obtained correlation value corresponds to the correlation value I, and the imaginary part corresponds to the correlation value Q. m represents the phase difference between the detection signal and the code signal, and corresponds to each propagation delay time range bin. The timing of the calculation is set so that the calculation is executed every period of the code signal. The IQ signal of each range bin is obtained by the method using the discrete Fourier transform described above.

Figure 2:
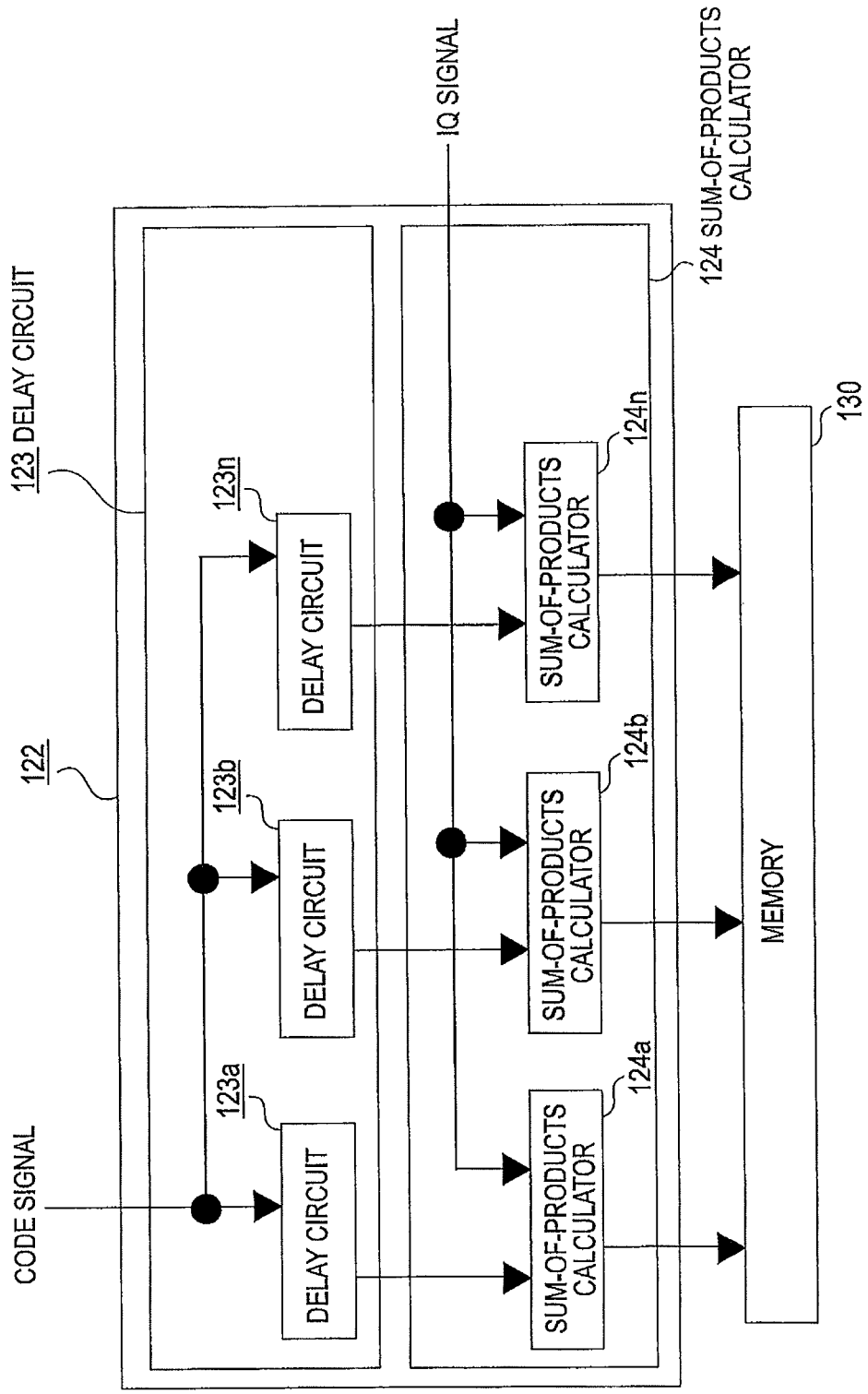
FIG. 2 is a block diagram showing an example using a delay circuit and a sum-of-products calculator as another example constituting a correlation calculator in the first embodiment of the present invention.

A method using a delay circuit 123 and a sum-of-products calculator 124 shown in FIG. 2 is used as another example constituting the correlation calculator 122.

The delay circuit 123 of n is constructed by delay circuits 123a, 123b, ..., 123n of n. The sum-of-products calculators 124 of n are constructed by a sum-of-products calculator 124a, a sum-of-products calculator 124b, a sum-of-products calculator 124n.

The code signal output from the code generator 111 is input to the delay circuits 123a, the delay circuit 123b, ..., the delay circuit 123n of n of the delay circuit 123 and delayed therein by only different delay times in the respective delay circuits to obtain delayed code signals, and the delayed code signals are output to the sum-of-products calculator 124.

The delay time is set according to the propagation delay time range bin.

The sum-of-products 124 executes the sum-of-products calculation of successively adding the multiplication result of the delayed code signal and the detection signal at the frequency corresponding to the sample number of one period of the code signal in each of the sum-of-products calculators 124a, 124b, ..., 124n to thereby calculate the correlation value I and the correlation value Q. The IQ signal of each range bin is obtained by the method using the plural delay circuits and the plural sum-of-products calculators as described above.

The storage unit 130 stores the IQ signal of each propagation delay time range bin output from the signal receiving unit 120 as an IQ signal sequence. The IQ signal sequence is added at the period of the first code signal. The IQ signal sequences which have been stored in the storage unit 130 till predetermined past time are transmitted as an IQ data arrangement to the determining unit 140. The IQ data arrangement is a two-dimensional arrangement in which the IQ signal sequences are piled up in the time direction.

The determining unit 140 takes the difference between the latest IQ signal sequence in the IQ data arrangement and an IQ reference signal sequence as an IQ signal sequence which was obtained in advance when no object exists, thereby calculating a differential IQ signal sequence. The determination is executed on the basis of the differential IQ signal sequence and a determination signal sequence as a preset threshold value. A bit flag representing existence of an object is put up for a range bin exceeding the threshold value. Specifically, the bit corresponding to the range bin number of the object flag arrangement is set to 1. The object flag arrangement and the differential IQ data arrangement are output to the object collator 401. The differential IQ data arrangement corresponds to a two-dimensional arrangement in which the differential IQ signal sequences till a predetermined past time are piled up in the time direction.

The second sensor 200 executes the same operation.

FIG. 3 is a diagram showing the relationship between the differential IQ data sequence and the propagation delay time when one object exists.

The signal transmitted from the first sensor 100 propagates in the leaking coaxial cable, and is radiated as an electric wave to the space. The radiated electric wave is reflected from a first object 701, and a reflection wave of the electric wave concerned propagates in the space again, and reaches the leaking coaxial cable. The electric wave reaching the leaking coaxial cable propagates in the leaking coaxial cable again, and is received by the first sensor 100.

With respect to the differential IQ signal sequence obtained in the determining part 142 in the first sensor 100, a propagation delay time range bin A is set on the abscissa axis and the signal intensity is set on the ordinate axis, thereby obtaining a peak waveform as shown in FIG. 3. The value of the propagation delay time range bin at the peak position corresponds to the propagation delay time. According to the following expression, the propagation delay time T1 is determined by a time t1 for which the electric wave propagates in the leaking coaxial cable and a time t2 for which the electric wave propagates in the space.

$$T1=2(t1+t2).$$

Likewise, in the second sensor 200, with respect to the differential IQ signal sequence determined in the determining unit 242, the propagation delay time range bin B is set on the abscissa axis, and the signal intensity is set on the ordinate axis, thereby obtaining a peak waveform as shown in the drawing. According to the following expression, the propagation delay time T2 is calculated from a time t3 for which the electric wave propagates in the leaking coaxial cable and a time t4 for which the electric wave propagates in the space.

$$T2=2(t3+t4)$$

FIG. 4 is a diagram showing the relationship between the differential IQ signal sequence and the propagation delay time when two objects exist.

The electric wave radiated form the leaking coaxial cable is reflected from a first object 701, and the reflection wave of the electric wave from the first object 701 propagates to the leaking coaxial cable.

Likewise, the electric wave radiated from the leaking coaxial cable is reflected from a second object 702, and the reflection wave of the electric wave from the second object 702 propagates to the leaking coaxial cable.

In the first sensor 100, with respect to the differential IQ signal sequence obtained in the determining part 142, the propagation delay time range bin A is set on the abscissa axis, and the signal intensity is set on the ordinate axis, thereby obtaining two peaks as shown in FIG. 4. The values of the propagation delay time range bin at the two peak positions correspond to the propagation delay time caused by the first object 701 and the propagation delay time caused by the second object 702. The waveform obtained when the propagation delay time range bin A is set on the abscissa axis and the signal intensity is set on the ordinate axis is called as "amplitude varying waveform A".

Likewise, in the second sensor 200, with respect to the differential IQ signal sequence obtained in the determining part 242, the propagation delay time range bin B is set on the abscissa axis, and the signal intensity is set on the ordinate axis, thereby obtaining two peaks as shown in FIG. 4. The values of the propagation delay time range bin at the peak positions correspond to the propagation delay time caused by the first object 701, and the propagation delay time caused by the second object 702, respectively. The waveform obtained when the propagation delay time range bin B is set on the abscissa axis and the signal intensity is set on the abscissa axis is called as "amplitude varying waveform B".

As described above, the first sensor 100 and the second sensor 200 detect presence or absence of an object and calculate the propagation delay time of reflection wave reflected from the object.

Next, the operation of detecting the two-dimensional position of the object and emitting an alarm by the detector 400 will be described.

The object collator 401 in the detector 400 executes pattern matching on the first differential IQ data arrangement obtained in the first sensor 100 and the second differential IQ data arrangement obtained in the second sensor 200 to obtain a combination of the same object. Then, the object collator 401 transmits the propagation delay time T1 and the propagation delay time T2 of each object to the map collator 402.

Next, the pattern matching method will be described.

A range bin number at which the flag is set to 1 is checked from the first object flag arrangement transmitted from the first sensor 100, and IQ time data A corresponding to the data in the time direction of the corresponding range bin is extracted from the first differential IQ data arrangement.

Likewise, a range bin number at which the flag is set to 1 is checked from the second object flag arrangement transmitted from the second sensor 200, and IQ time data B corresponding to the data in the time direction of the corresponding range bin is extracted from the second differential IQ data arrangement. The extraction time of the IQ time data is set to several seconds.

A calculation result of the amplitude from the IQ time data A and a calculation result of the amplitude from the IQ time data B are output as an actual time waveform A and an actual time waveform B, respectively. The correlation rate between the actual time waveform A and the actual time waveform B is calculated. The actual time waveform A is fixed, and the correlation rates of all the actual time waveforms B in which the second object flag is set to 1 are calculated. A combination which provides the largest correlation rate is identified as being obtained by observing the same object. When identified, the propagation delay times T1, T2 corresponding to the respective range bins are output to the map collator 402. This operation is executed on all the objects for which the first object flat is set to 1.

FIGS. 5A to 5D are diagrams showing the pattern matching.

FIGS. 5A to 5D are diagrams showing actual time waveforms A of the first object and the second object observed by the first sensor 100 when the actual time is set on the abscissa axis, and the amplitude value is set on the ordinate axis.

Figure 5A:
FIG. 5 is a diagram showing pattern matching in the first embodiment of the present invention.
Figure 5B:
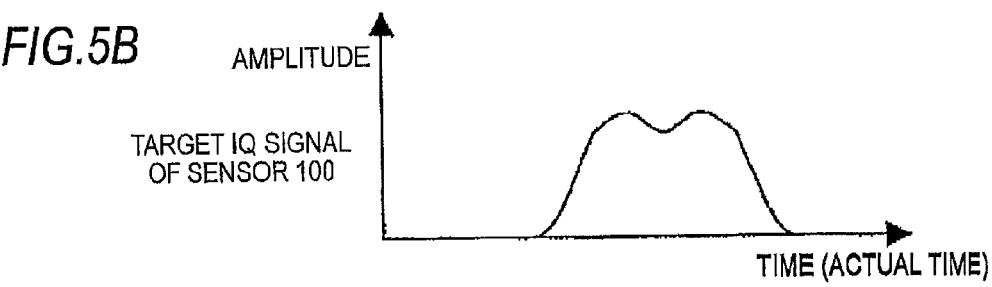
Figure 5C:
Figure 5D:
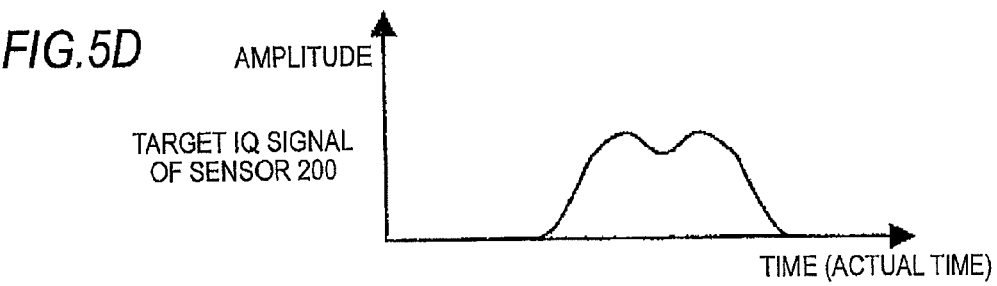

FIGS. 5C and 5D are diagrams showing actual time waveforms B of the first object and the second object observed by the second sensor 200.

In each sensor, there are two actual time waveforms, a combination having the same actual time waveform pattern between the two actual time waveforms is found. A different waveform is obtained every object in accordance with the approach timing of the object to the detection area, time variation of amplitude level caused by the size or behavior of the object, and thus the combination having the high correlation is found. Accordingly, the combination of FIGS. 5A and 5C and the combination of FIGS. 5B and 5D are obtained.

Here, another pattern patching method will be described.

According to this method, the correlation rate in time variation locus between the IQ time data A and the IQ time data B is calculated.

FIGS. 6A and 6B show IQ time data A of the first object and the second object observed by the first sensor 100, and FIGS. 6C and 6D show IQ time data B of the first object and the second object observed by the second sensor 200.

In order to find the same combination, the I signal of each IQ time data is set as a real number, and the Q signal thereof is set as an imaginary number to set a complex number. Then, the complex cross-correlation is calculated. As described in the previous example, the IQ time data A is fixed, and the correlation value between the IQ time data A and the IQ time data B is calculated. A combination having the largest correlation value is identified. When identified, the propagation delay times T1 and T2 corresponding to the respective range bins are output to the map collator 402. This operation is executed on all the objects for which the first object flag is set to 1.

When an object moves in parallel to the leaking coaxial cable, approach of the object to the leaking coaxial cable is observed the first sensor 100 while separation of the object from the leaking coaxial cable is observed the second sensor 200. Accordingly, the rotational direction of the locus drawn on the IQ plane is opposite between the first sensor 100 and the second sensor 200.

Furthermore, when the object moves in the vertical direction to the leaking coaxial cable, the approach and the separation of the object is similarly observed by the first sensor 100 and the second sensor 200. Accordingly, the rotational direction of the locus drawn on the IQ plane is identical between the first sensor 100 and the second sensor 200.

As described above, the moving direction of the object and the rotational direction of the locus drawn on the IQ plane correlate with each other. The variations of the magnitude of the amplitude and the time variation on the IQ plane are different in accordance with the size or behavior of the object as described above. By pattern-matching the IQ pattern, the combinations of FIG. 6A and FIG. 6c and FIG. 6B and FIG. 6D can be obtained.

The map collator 402 calculates the coordinate of the object from the propagation delay times T1 and T2 according to a preset calculation table, and outputs the coordinate of the object to the determining part 403.

The calculation table contains two two-dimensional arrangements, and in the first arrangement, x-coordinate is set with the propagation delay times T1 and T2 set as arguments while in the second arrangement, y-coordinate is set with the propagation delay times T1 and T2 set as arguments.

In this calculation table, a set value can be theoretically calculated at a linear portion.

Figure 7:
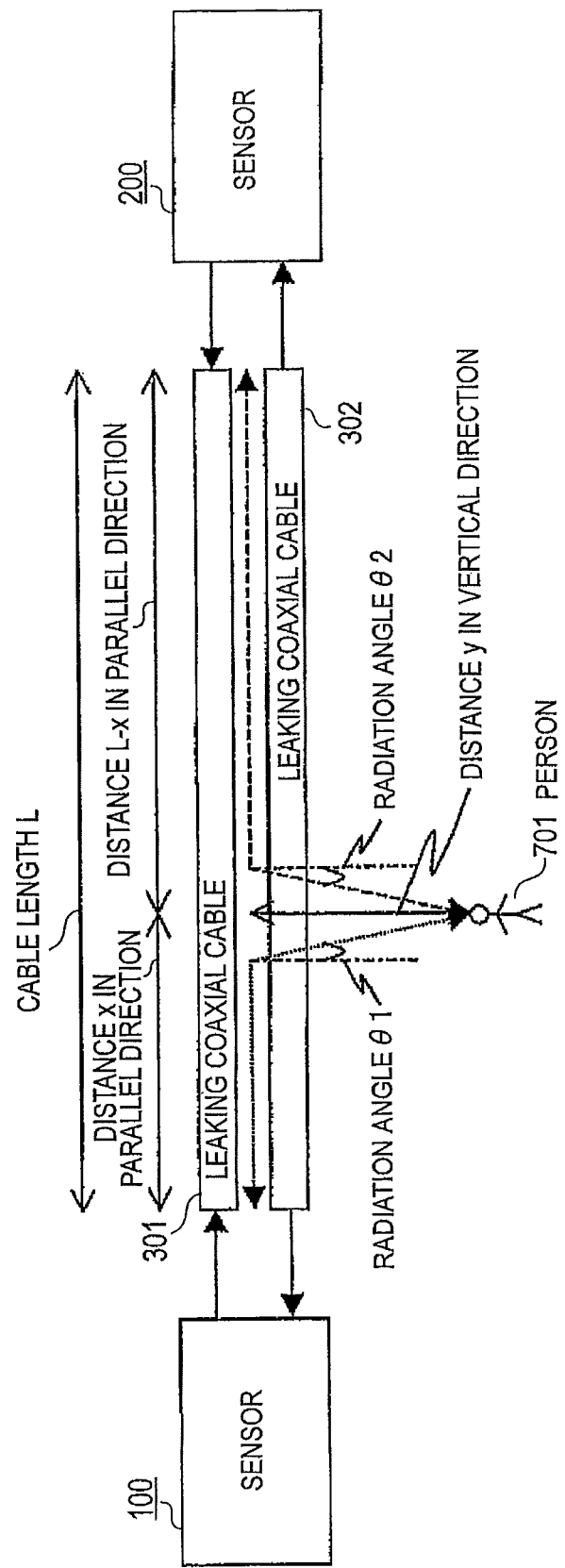
FIG. 7 is a diagram showing the basic principle for deriving the position of the object from a first propagation delay time T1 of the first sensor and a second propagation delay time T2 of the second sensor in the first embodiment of the present invention.

FIG. 7 is a diagram showing the basic principle of deriving the position of the first object 701 from the first propagation delay time T1 of the first sensor 100 and the second propagation delay time T2 of the second sensor 200.

First and second leaking coaxial cables 301 and 302 having length L are laid on substantially in parallel to each other. With respect to the distance of the first object 701 in the cable parallel direction distance, the distance from the first sensor 100 side is represented by x, the distance from the second sensor 200 side is represented by L-x, and the cable vertical direction distance is represented by y. The radiation directivities of the first and second leaking coaxial cables 301 and 302 of the first sensor 100 is set to an angle θ1, and the radiation directivities of the first and second leaking coaxial cables 301 and 302 of the second sensor 200 is set to an angle θ2.

By using the distances of the object x, L-x, y, the velocity of light c and the wavelength reduction rate K of the leaking coaxial cable, the following times are calculated.

$$t3 = x/K \cdot c \quad (1)$$

$$t4 = (L-x)/K \cdot c \quad (2)$$

$$t5 = y/c \quad (3)$$

By using these times and the angles θ1 and θ2 of the radiation directivities, the propagation delay times T1 and T2 are represented as follows.

$$T1 = 2\left(t3 + t5 \cdot \frac{\tan(\theta 1)}{K} + \frac{t5}{\cos(\theta 1)}\right) \quad (4)$$

$$T2 = 2\left(t4 + t5 \cdot \frac{\tan(\theta 2)}{K} + \frac{t5}{\cos(\theta 2)}\right) \quad (5)$$

Furthermore, t3 and t4 satisfy the following expression by using the cable length L.

$$L = (t3 + t4) \cdot K \cdot c \quad (6)$$

By solving the simultaneous equations (4) to (6), t3, t4 and t5 are determined.

And, the coordinates x and y of the first object 701 are determined by using equations (1) and (3).

The calculation table is created on the basis of the forgoing principle. These equations are satisfied when the first and second leaking coaxial cables 301 and 302 are installed substantially in parallel to each other.

Figure 8:
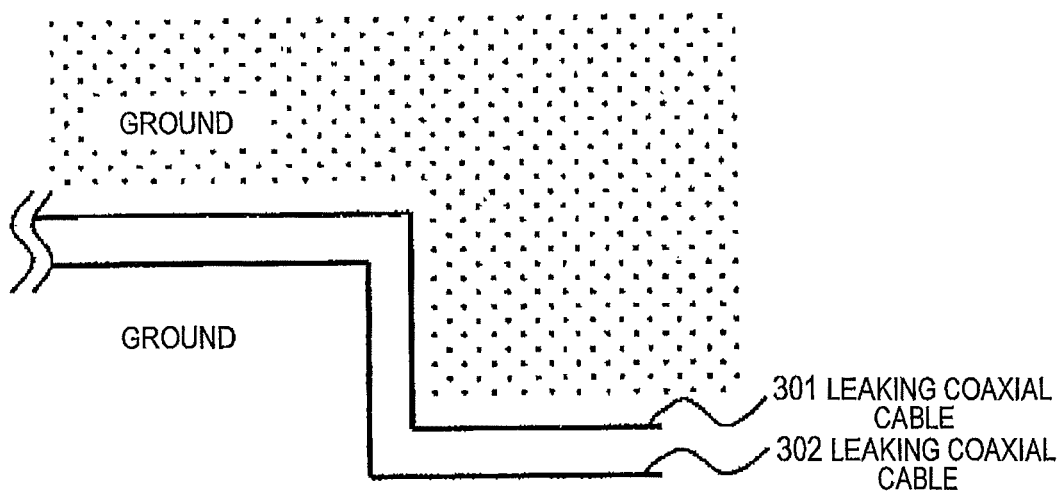
FIG. 8 is a diagram showing an example in which a leaking coaxial cable is laid down in an L-shape in the first embodiment of the present invention.

Therefore, with respect to a peripheral area around the leaking coaxial cables laid in an L-shape or S-shape as shown in FIG. 8, a data base is created on the basis of actually measured data. At this time, the data base is created from data which are obtained by moving an object in advance in an area for which the data base is created.

Even when a building or a metal object exists circumferentially and thus a deviation occurs in the propagation time, the calculation table is corrected by actual measurement.

The determining part 403 uses a preset warning table to determine the object coordinate calculated by map collator 402. In the warning table, 1 or 0 is set with the coordinates x and y set as arguments. When the value of the warning table of the object coordinate is set to 1, warning information is output to the alarm unit 501.

The alarm unit 501 outputs the position of the object on the display or the like, and outputs voice based on the object position to a speaker or the like.

Here, in the first embodiment, the leaking coaxial cable is used, however, a linear cable which can receive/transmit electric waves such as a leaking wave guide tube, an open coaxial cable or the like may be used in place of the leaking coaxial cable.

Furthermore, the propagation-time-basis IQ component measuring means is not limited to the modulation method based on the code sequence, and various methods using FM-CW signal, FM pulse signal, OFDM signal, etc. may be applied. The modulation method based on the code sequence is representatively used to describe the first embodiment.

Effect of the First Embodiment

According to the first embodiment, the object coordinate of each of plural objects can be determined.

Two sensor devices observe an object by using signals which are modulated with code sequences having low cross-correlation, and thus the object can be observed in the same frequency band. When the frequency band is identical, they can be constructed by the same H/W, and thus an observing system can be constructed in low cost.

The IQ time data are calculated every range bin, and a combination problem of plural objects is solved on the basis of the IQ time data. Therefore, even when plural objects exist, the coordinate of each object can be calculated accurately.

By using the calculation table, the object coordinate can be accurately measured at a non-linear portion of each of the first and second leaking coaxial cables 301, 302. Furthermore, the object coordinate can be accurately calculated even when a building or a metal object exists circumferentially.

By using the warning table, the warning area can be minutely set, and it is not necessarily required to lay on a leaking coaxial cable along a monitoring area. Therefore, the degree of laying is increased, and the laying is facilitated. Furthermore, the system can be set so that a near area through which a large-size object such as a vehicle or the like passes is excluded from warning targets, and thus needless warning is prevented from occurring.

Second Embodiment

Figure 9:
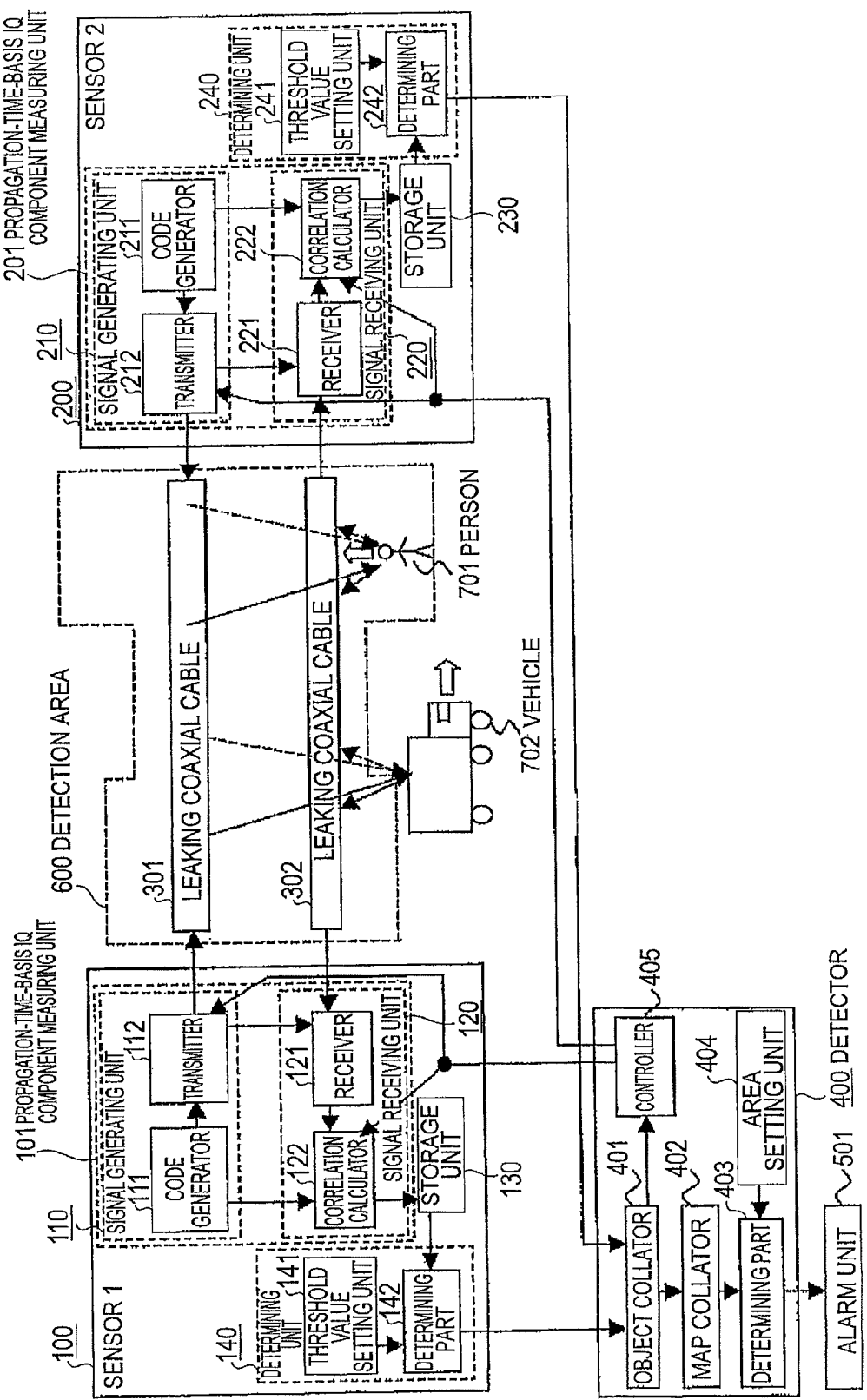
FIG. 9 is a block diagram showing another example of the system construction in a second embodiment of the present invention.

FIG. 9 is a block diagram showing an example of a system construction according to a second embodiment.

In FIG. 9, reference numeral 405 represents a controller.

In FIG. 9, the blocks having the same reference numerals as shown in FIG. 1 have the same operations and functions as shown in FIG. 1. However, the transmitters 112 and 212 and the correlation calculators 122, 222 are connected to the controller 405, and subjected to ON/OFF control on the basis of an operation signal from the controller 405.

First or after second reception information described later is received, the controller 405 turns on the transmitter 112 and the correlation calculator 122, and turns off the transmitter 212 and the correlation calculator 222. The first sensor 100 which is set to ON state observes objects, and outputs the first object flag arrangement and the first differential IQ data arrangement to the object collator 401.

When receiving the first object flag arrangement and the first IQ data arrangement from the first sensor 100, the object collator 401 transmits first reception information to the controller 405.

When receiving the first reception information, the controller 405 turns off the transmitter 112 and the correlation calculator 122, and turns on the transmitter 212 and the correlation calculator 222. The second sensor 200 which is set to ON state observes objects and outputs the second object flag arrangement and the second IQ data arrangement to the object collator 401.

When receiving the second object flag arrangement and the second differential IQ data arrangement from the second sensor 200, the object collator 401 transmits the second reception information to the controller 405.

Subsequently, since the object collator 401 receives the first object flag arrangement, the first differential IQ data arrangement, the second object flag arrangement and the second differential IQ data arrangement, the object collator 401 obtains the combination for the same object according to the pattern matching by using the first differential IQ data arrangement obtained in the first sensor 100 and the second differential IQ data arrangement obtained in the second sensor 200 as described with reference to the first embodiment. Then, the object collator 401 transmits the propagation delay time T1 and the propagation delay time T2 of each object to the map collator 402. The subsequent operation is the same as described with reference to the first embodiment.

In the first embodiment, the first transmission signal and the second transmission signal are output simultaneously. However, in the second embodiment, these signals are alternately output. That is, the observation is performed time-divisionally. According to the first embodiment, the first transmission signal and the second transmission signal are simultaneously output, and thus the interference between the first and second transmission signals is suppressed. Therefore, different code sequences which are low in cross-correlation are used. However, since the cross-correlation is not perfectly equal to zero, an interference effect occurs when high-sensitive observation is performed. That is, when a remarkably far object or a very small object is observed, there occurs a problem that the object is vanished by the interference and thus the object cannot be observed.

In the second embodiment, the signals are alternately observed, and thus a remarkably far object or a very small object can be observed with high sensitivity.

Third Embodiment

Figure 10:
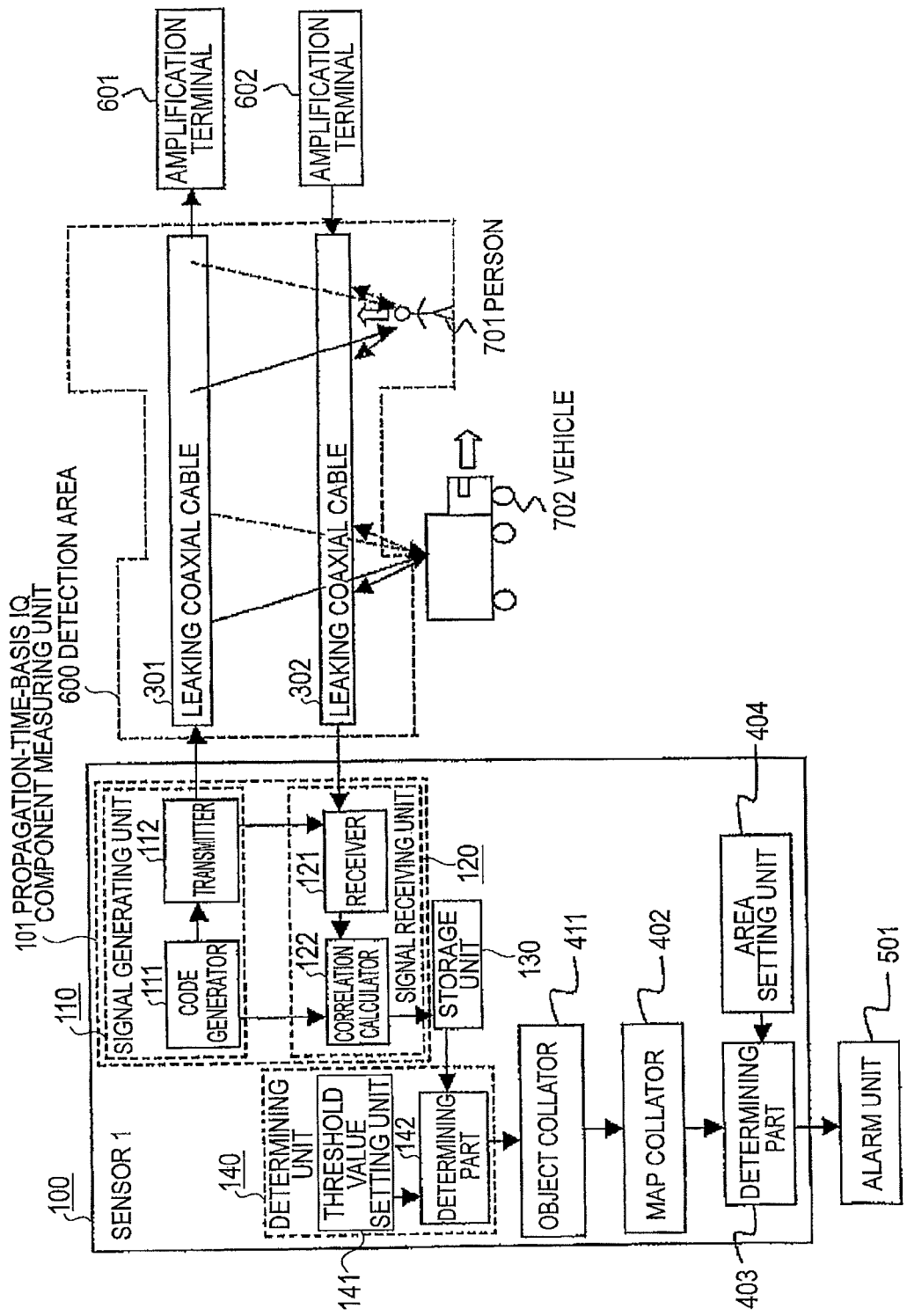
FIG. 10 is a block diagram showing another example of the system construction in a third embodiment of the present invention.

FIG. 10 is a diagram showing the construction of a system according to a third embodiment.

In FIG. 10, reference numerals 601 and 602 represent first and second amplification terminals (second equipment).

The third embodiment is characterized in that in place of the second sensor d200 described in the first embodiment, the first amplification terminal 601 and the second amplification terminal 602 are connected to the end point of the first leaking coaxial cable 301.

The amplification terminal amplifies a signal input thereto and changes the propagation direction of the signal. That is, it acts as if a sensor is connected to the place where the amplification terminal is located. That is, an image of the sensor can be created. The reason for this will be described with reference to FIG. 13.

Figure 11:
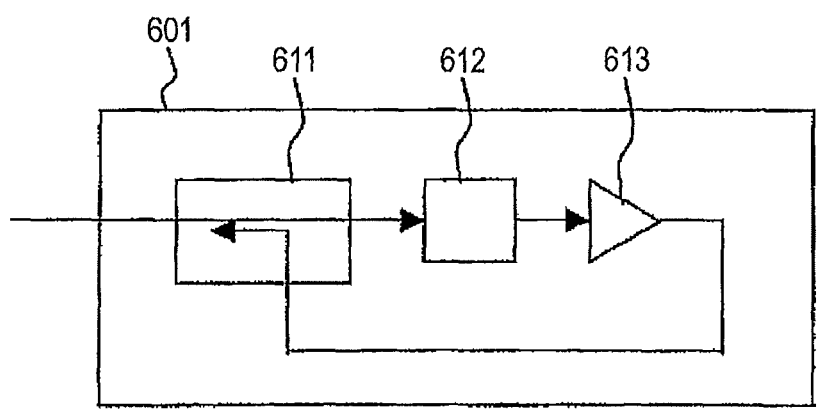
FIG. 11 is a block diagram showing a construction example of an amplification terminal in a third embodiment of the present invention.

FIG. 11 shows an example of the construction of the amplification terminal.

In FIG. 11, reference numeral 611 represents a directional coupler, reference numeral 612 represents a filter and reference numeral 613 represents an amplifier.

The directional coupler 611 is connected to the first leaking coaxial cable 301, a filter 612 and an amplifier 613, and it passes a signal input from the first leaking coaxial cable 301 to the filter 612 and also passes a signal input from the amplifier 613 through the first leaking coaxial cable 301. Here, a component of the signal which is input from the amplifier 613 and leaks to the filter 612 is sufficiently attenuated.

The filter 612 removes components in an unnecessary frequency band from the input signal, and outputs the signal to the amplifier 613. The amplifier 613 amplifies the signal by only the amount corresponding to the loss of the first leaking coaxial cable 301.

Next, the method of processing this image signal by the first sensor 100 will be described.

Figure 12:
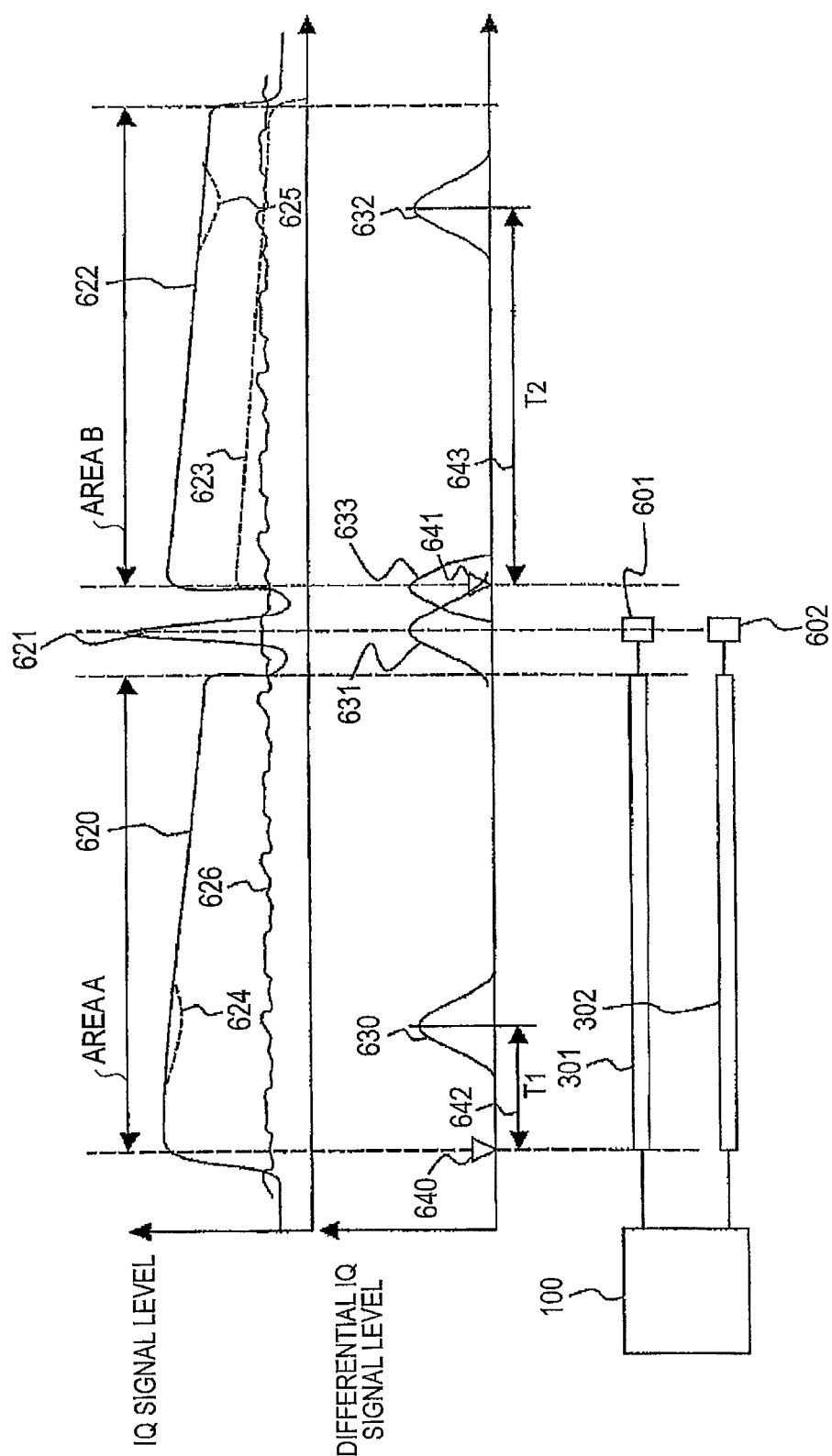
FIG. 12 is a diagram showing an IQ signal and a differential IQ signal sequence every propagation delay time range bin observed by the first sensor in the third embodiment of the present invention.

FIG. 12 shows an IQ signal and a differential IQ signal sequence of each propagation delay time range bin which is observed by the first sensor 100.

In FIG. 12, a waveform 620 represents components which are coupled from the first leaking coaxial cable 301 to the second leaking coaxial cable 302, and the IQ signal level is increased at the propagation delay time range bin by only the amount corresponding to the length of the cable.

Figure 13A:
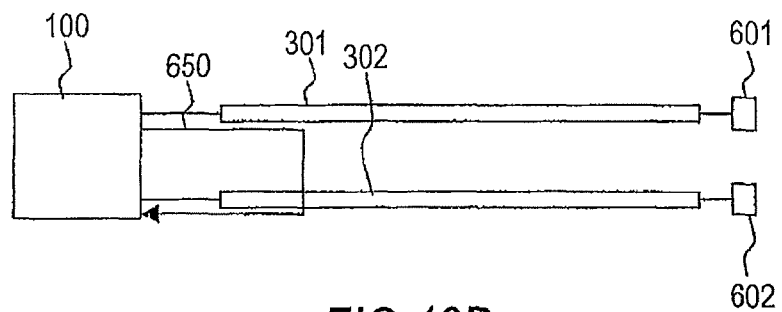
FIG. 13A is a diagram showing a path through which a signal output from a first sensor is radiated from a first leaking coaxial cable, received by a second leaking coaxial cable and input to the first sensor in the third embodiment of the present invention.

A signal path 650 of FIG. 13A represents one of the components, and in this path, a signal output from the first sensor 100 is radiated from the first leaking coaxial cable 301, received by the second leaking coaxial cable 302 and then input to the first sensor 100. The area in which the IQ signal level is increased is referred to as an area A (see FIG. 12).

A waveform 621 of FIG. 12 represents a signal component having a sharp peak. This component is a component of a signal output from the first sensor 100 which is radiated from the first leaking coaxial cable 301 and received by the second leaking coaxial cable 302, furthermore, propagates to the second amplification terminal 602 to be amplified, passes through the second leaking coaxial cable 302 again and then is input to the first sensor 100 as indicated by a signal path 652 of FIG. 13C. Furthermore, there is a component of a signal output from the first sensor 100 which is amplified at the first amplification terminal 601, passed through the first leaking coaxial cable 301 again, radiated from the first leaking coaxial cable 301, received by the second leaking coaxial cable 302 and then input to the first sensor 100 as indicated by a signal path 653 of FIG. 13D.

As described above, a path along which a signal passed through the first leaking coaxial cable 301 and radiated from the first leaking coaxial cable 301 is located at any place of the leaking coaxial cable, and all the propagation delay times of these paths are equal to one another, so that the waveform 621 (see FIG. 12) has a sharp peak.

A waveform 622 in FIG. 12 represents a twice-reflected component of the signal output from the first sensor 100 which is amplified at the first amplification terminal 601, passed through the first leaking coaxial cable 301 again, radiated from the first leaking coaxial cable, received by the second leaking coaxial cable 302, passed through the second leaking coaxial cable 302 to the second amplification terminal 602, amplified by the second amplification terminal 602, passed through the second leaking coaxial cable 302 again and then input to the first sensor 100. Therefore, the IQ signal level is increased at the propagation delay time range bin by the amount corresponding to the length of the cable. The area where the IQ signal level increases is referred to as area B (see FIG. 12).

Here, the signal component of the area A is identical to the signal ob served by the first sensor 100 described in the first embodiment. On the other hand, the signal component of the area B is a signal observed from the opposite side of the leaking coaxial cable to the first sensor 100 as in the case of the signal observed by the second sensor 200 described in the first embodiment.

The area A and the area B are different from each other in propagation delay time, and thus they are separated and set by the propagation delay time. In FIG. 12, a starting point 640 is a baseline for the head of the area A, and a base point 641 represents a baseline for the head of the area B.

The signal waveform of the twice-reflected component is delayed by the double of the cable length, and such a waveform that the second sensor 200 is connected to the terminal side can be observed.

That is, the signal image observed by the second sensor 200 is projected to the back side of the area A of the signal observed by the first sensor 100, and thus this signal is called as an image signal as described above.

Figure 13B:
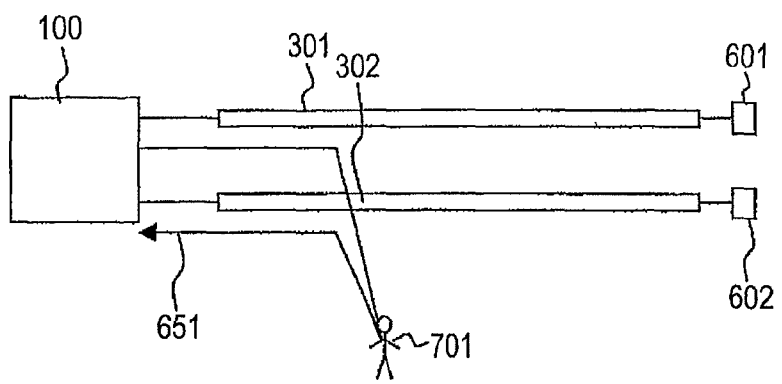
FIG. 13B is a diagram showing a signal path for detecting an object and also shows a component of the signal output from the first sensor, which is radiated from the first leaking coaxial cable, reflected from the object, received by the second leaking coaxial cable and then returned to the first sensor in the third embodiment of the present invention.
Figure 13C:
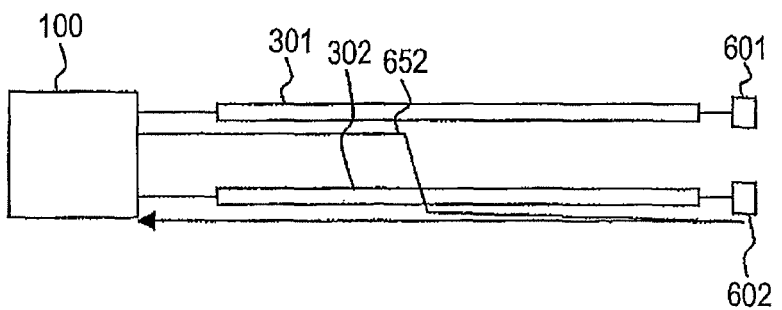
FIG. 13C is a diagram showing a component of the signal output from the first sensor, which is radiated from the first leaking coaxial cable, received by the second leaking coaxial cable, propagates to a second amplification terminal to be amplified, passes through the second leaking coaxial cable again and then input to the first sensor in the third embodiment of the present invention.
Figure 13D:
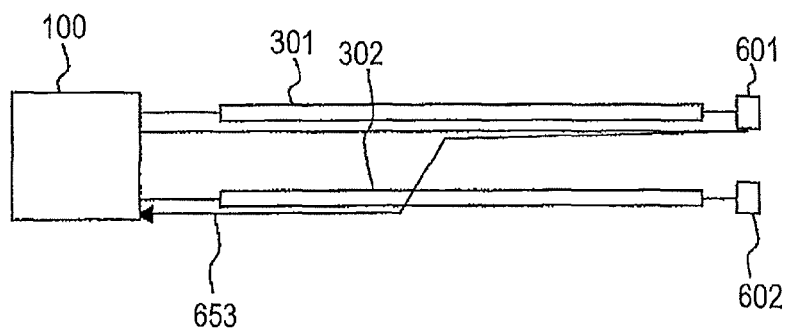
FIG. 13D is a diagram showing a component of the signal output from the first sensor, which is amplified at a first amplification terminal, passes through the first leaking coaxial cable again, reflected from the first leaking coaxial cable, received by the second leaking coaxial cable and then input to the first sensor in the third embodiment of the present invention.
Figure 13E:
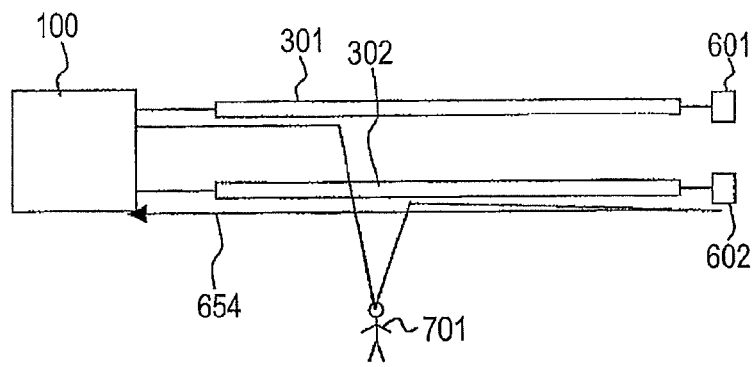
FIG. 13E is a diagram showing a once-reflected component of the signal output from the first sensor, which is radiated from the first leaking coaxial cable, reflected from the object, received by the second leaking coaxial cable, amplified at the second amplification terminal, passed through the second leaking coaxial cable again and returned to the first sensor in the third embodiment of the present invention.
Figure 13F:
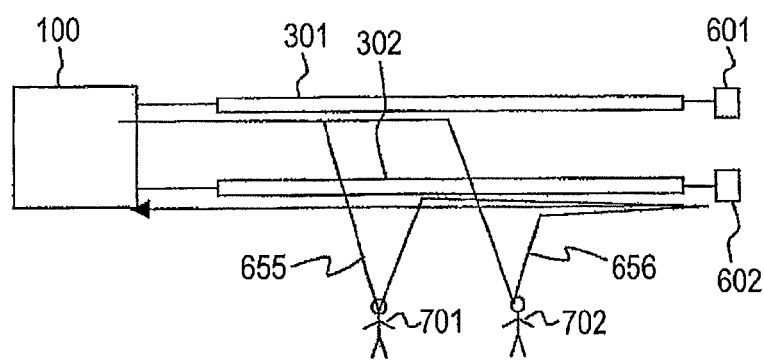
FIG. 13F is a diagram showing that there is a signal path in which the signal output from the first sensor is reflected from a first object and a signal path in which the signal output from the first sensor is reflected from a second object, and these signal paths have the same path length when the separation distance between the second leaking coaxial cable and the first object is equal to the separation distance between the second leaking coaxial cable and the second object in the third embodiment of the present invention.
Figure 13G:
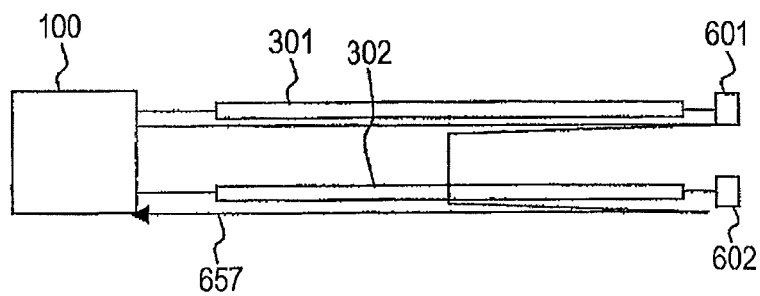
FIG. 13G is a diagram showing a twice-reflected component of the signal output from the first sensor, which is amplified at the first amplification terminal, passed through the first leaking coaxial cable again, reflected from the first leaking coaxial cable, received by the second leaking coaxial cable, propagates to the second amplification terminal, is amplified at the second amplification terminal, passed through the second leaking coaxial cable and then input to the first sensor in the third embodiment of the present invention.
Figure 13H:
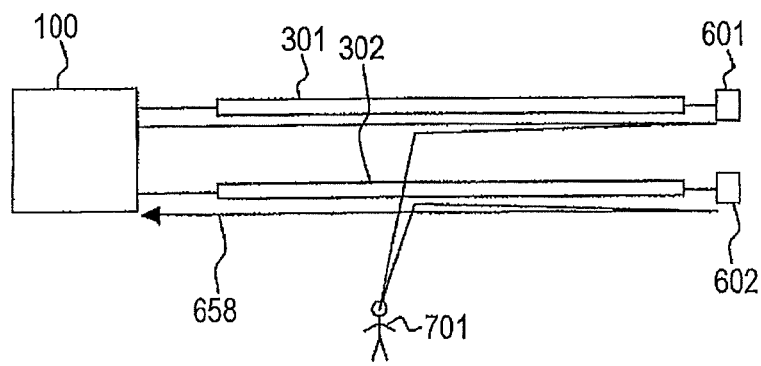
FIG. 13H is a diagram showing a signal path for detecting an object in the third embodiment of the present invention.

In this embodiment, an object is detected by using a signal path 651 of FIG. 13B and a signal path 658 of FIG. 13H.

In FIG. 12, gaps having no signal therein exist between the area A and the waveform 621 and between the waveform 621 and the area B. This corresponds to the propagation delay time when the signal passes through the amplification terminal. The existence of this delay time enables the areas A and B to be separated from each other without overlapping with the waveform 621. Therefore, a delay which is necessary as resolution of the range bin may be provided. It is efficient to create the delay by using a group delay of the filter 612 in the amplification terminal.

When this delay is not proper, the areas A and B are overlapped with the waveform 621, and thus the position of an object in the neighborhood of the amplification terminal of the leaking coaxial cable cannot be correctly measured.

Next, an observation signal of an object reflection component will be described.

A peak 630 of FIG. 12 corresponds to the amplitude variation waveform A described in the first embodiment.

As indicated by the signal path 651 of FIG. 13B, this peak corresponds to a component of the signal output from the first sensor 100 which is radiated from the first leaking coaxial cable 301, reflected from an object, received by the second leaking coaxial cable 302 and returned to the first sensor 100. The propagation delay time from the end point at the first sensor 100 side of the first leaking coaxial cable 301 to the endpoint at the first sensor 100 side of the second leaking coaxial cable 302 is referred to as propagation delay time (T1) 642.

As indicated by the signal path 654 of FIG. 13E, the peak 631 of FIG. 12 corresponds to a once-reflected component of the signal output from the first sensor 100 which is radiated from the first leaking coaxial cable 301, reflected from the object, received by the second leaking coaxial cable 302, amplified at the second amplification terminal 602, passed through the second leaking coaxial cable 302 again and then returned to the first sensor 100.

This signal is delayed from the waveform 621 by the amount corresponding to propagation in the space in which the signal radiated from the first leaking coaxial cable 301 is reflected from the object and then enters the second leaking coaxial cable 302. Here, when there are two objects, there are a signal path 655 along which the signal is reflected from a first object 701 and a signal path 656 along which the signal is reflected from a second object 702 as shown in FIG. 13F. The signal paths 655 and 656 have the same path length when the separation distance between the second leaking coaxial cable 302 and the first object 701 is equal to the separation distance between the second leaking coaxial cable 302 and the second object 702. Furthermore, when the separation distances are different from each other, the peak 633 occurs in the neighborhood of the peak 631. The interval between the waveform 621 and the peak 631, 633 is the delay time corresponding to the separation distance. However, as is apparent from the figures, it is not identifiable which one of the peaks 631 and 633 corresponds to the separation distance of the object 701, 702. Furthermore, when many objects exist, many peaks occur between the peaks 631 and 633, and these peaks cannot be separated from one another. As described above, with respect to the signal which is output from the leaking coaxial cable, reflected from the object and then received by the leaking coaxial cable, the object observation using a signal whose propagation direction at the output time is identical to the propagation direction of the received signal thereof (this signal is called as "far end wave") cannot substantially separate plural objects. Accordingly, the present invention does not use this signal.

With respect to the signal path 651 of FIG. 13B and the signal path 658 of FIG. 13H, the propagation direction at the output time is opposite to the propagation direction of the received signal thereof (this signal is called as "near end wave"), and the present invention is characterized by using this near end wave.

A signal 632 of FIG. 12 corresponds to the amplitude variation waveform B described in the first embodiment.

As indicated by the signal path 658 of FIG. 13H, the signal 632 is a component of the signal output from the first sensor 100 which is passed through the first leaking coaxial cable 301, amplified at the first amplification terminal 601, passed through the first leaking coaxial cable 301 again, radiated from the first leaking coaxial cable 301, reflected from the object, received by the second leaking coaxial cable 302, amplified at the second amplification terminal 602, passed through the second leaking coaxial cable 302 again and then returned to the first sensor 100. The propagation delay time from the end point at the first amplification terminal 601 side of the first leaking coaxial cable 301 to the end point at the second amplification terminal 602 side of the second leaking coaxial cable 302 is referred to as "propagation delay time (T2) 643".

Here, the starting point 640 is a baseline for the propagation delay time (T1) 642 of the propagation delay time range bin of the area A observed by the first sensor 100, and the starting point 641 is a baseline for the propagation delay time (T2) 643 of the area B.

The object collator 411 determines the combination of the same object by pattern matching as in the case of the object collator 401 of the first embodiment.

The starting points 640 and 641 are preset, and the propagation delay time of the range bin corresponding to the peak of the amplitude variation wave is calculated from the propagation delay time range bin, whereby the propagation delay time (T1) 642 and the propagation delay time (T2) 643 are determined. The propagation delay time T1 and the propagation delay time T2 of each object are transmitted to the map collator 402.

Subsequently, the same operation as the first embodiment is executed.

A waveform 626 is a noise floor of the first sensor 100. Signals below the noise floor 626 are embedded in noises and thus cannot be observed. For example, a waveform 623 is a waveform of the area B when a short-circuited terminal is used in place of the amplification terminal. The short-circuited terminal is constructed by connecting an inner conductor and an outer conductor of a coaxial cable through a resistor of zero ohm. As compared with a waveform 622 when the amplification terminal is connected, the level is reduced. However, when the leaking coaxial cable is short and thus sufficient level can be observed, the signal of the area B can be also obtained according to this method.

There is a method in which the amplification terminal is not connected to both the leaking cables, but connected to only the transmission leaking cable. In this case, the short-circuited terminal is connected to the reception leaking cable.

The amplification terminal is required to be constructed by an amplifier having small noise such as a low noise amplifier or the like, and a little noise enters the amplification terminal. The amplification terminal is not provided to only the reception side, whereby NF (noise figure) is improved and the sensitivity is enhanced.

In the third embodiment, the system of combining the directional coupler and the amplifier has been described as an example of the construction of the amplification terminal. However, this is an example, and any system may be applied insofar as it amplifies a signal and changes the signal propagation direction.

As described above, according to the third embodiment, by using the amplification terminal, the second sensor 200 is not required, and thus the two-dimensional position of an object can be determined in low cost.

By providing the filter with a necessary delay time, the area A and the area B can be separated from the unnecessary waveform 621, and the position of an object can be correctly detected in all the area of the leaking coaxial cable.

Fourth Embodiment

Figure 14:
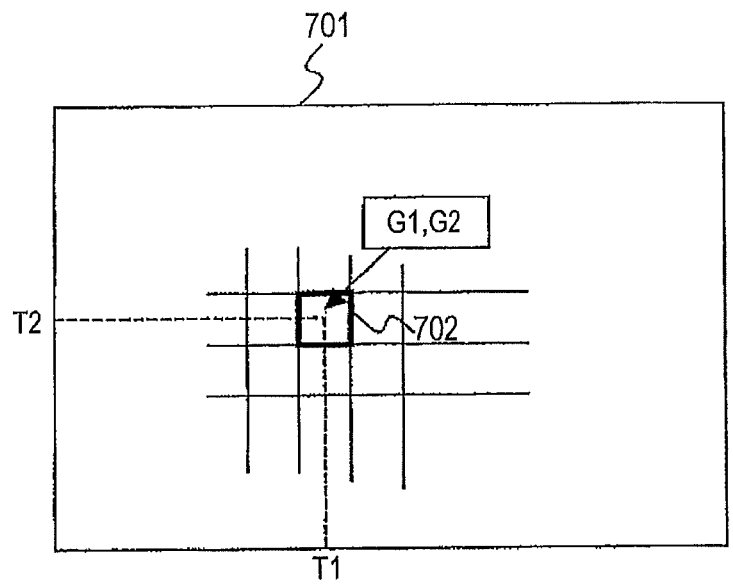
FIG. 14 is a diagram showing an example of a table of a two-dimensional arrangement in a fourth embodiment of the present invention.

FIG. 14 is a diagram showing a fourth embodiment.

In the first to third embodiments, an alarm is emitted when the two-dimensional position of an object enters a predetermined range. However, according to the fourth embodiment, a scattering cross section or speed of an object is added as an element for determination as to whether an alarm is emitted or not.

The operation of the object collator 401 in the first to third embodiments will be described below.

In FIG. 14, reference numeral 701 represents a two-dimensional arrangement table, and reference numeral 702 represents some element in the two-dimensional arrangement.

In the table 701, elements 702 are allocated with the propagation delay times T1, T2 set as arguments. Two numerical values are preset in each element. The numerical values of the element 702 are represented by G1 and G2.

Figure 15:
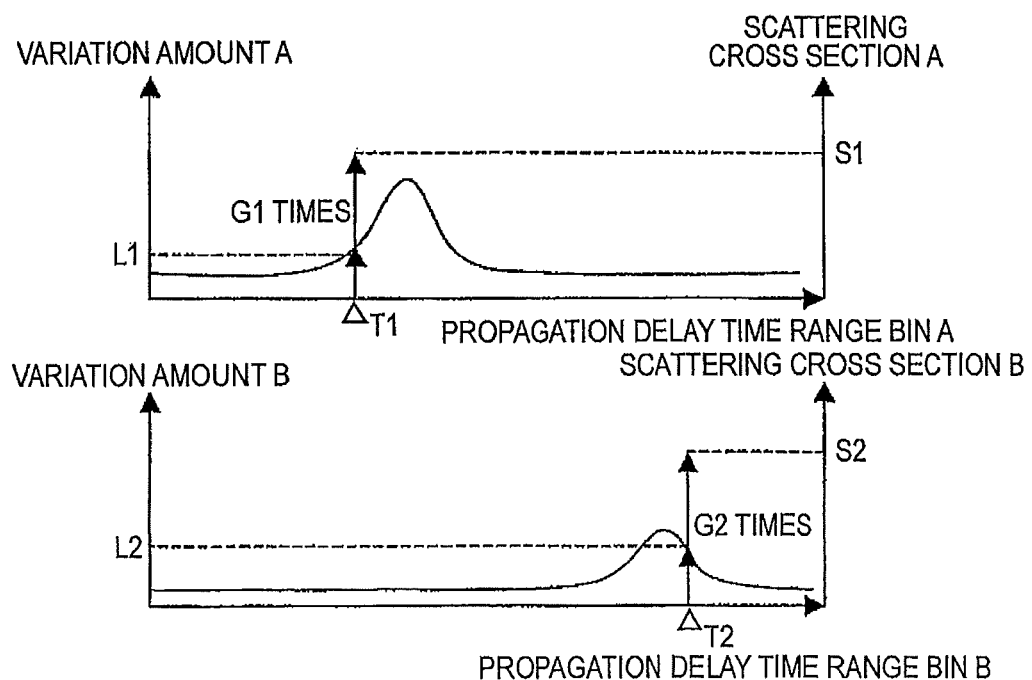
FIG. 15 is a diagram showing a fourth embodiment of the present invention, and also shows an example in which the value L1 of an amplitude variation waveform A of a propagation delay time T1 is multiplied by G1 and the multiplication result is represented by S1 while the value L2 of an amplitude variation waveform B of a propagation delay time T2 is multiplied by G2 and the multiplication result is represented by S2.

As shown in FIG. 15, G1 represents the numerical value by which the value of the amplitude variation waveform A is multiplied, and the value L1 of the amplitude variation waveform A of the propagation delay time T1 is multiplied by G1, and the multiplication result is represented by S1.

G2 represents the numerical value by which the value of the amplitude variation waveform B is multiplied, and the value L2 of the amplitude variation waveform B of the propagation delay time T2 is multiplied by G2, and the multiplication result is represented by S2.

Figure 16:
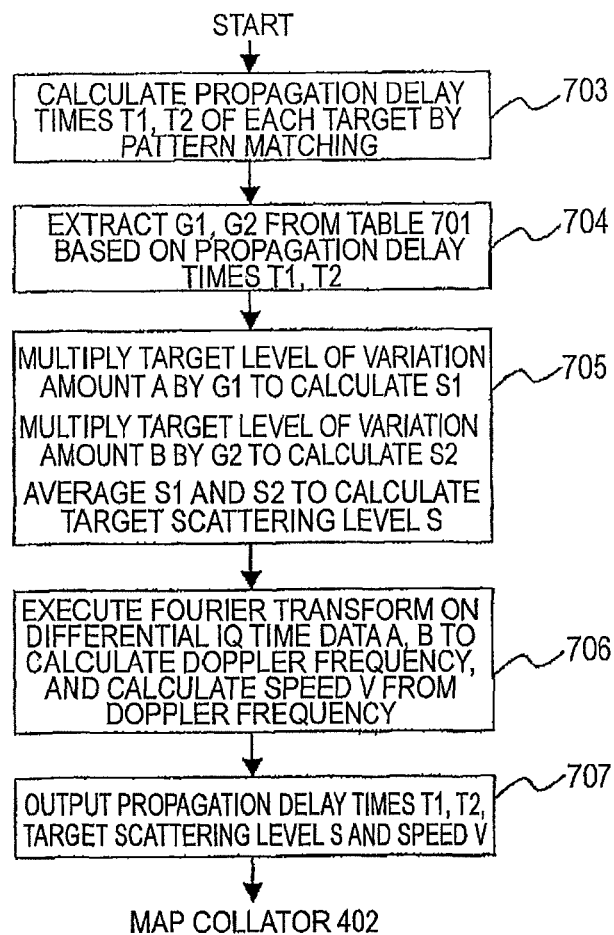
FIG. 16 is a diagram showing an example of a processing flow in the fourth embodiment of the present invention.

FIG. 16 shows a processing flow.

In step 703, the propagation delay times T1, T2 of each object are calculated by pattern matching as described in the first to third embodiments.

In step 704, G1 and G2 are extracted from the table 701 on the basis of the propagation delay times T1, T2.

As described above, in step 705, S1 and S2 are determined, and an object scattering level S is determined according to S=(S1+S2)/2.

In step 706, the differential IQ time data A and B are subjected to Fourier transform to calculate Doppler frequencies, and the speed V is calculated from the average of the absolute values of the respective Doppler frequencies.

In step 707, the propagation delay times T1, T2, the object scattering level S and the speed V are output to the map collator 402.

As in the case of the first to third embodiments, the map collator 402 determines the object coordinate, and transmits the object coordinate, the object scattering level S and the speed V to the determining part 403.

The determining part 403 determines the object coordinate and the object scattering level by using a preset warning table. The range of the scattering level and the range of the speed are set in the warning table with the coordinates x, y set as arguments. On the basis of the object coordinate output from the map collator 402, the scattering level range and the speed range are subtracted from the warning table, and when the object scattering level S and the speed V are located within this range, the warning information is output to the alarm unit 501.

A method of setting the numerical values G1 and G2 will be described.

These numerical values are set so as to compensate for the round-trip transmission loss of the leaking cable and the round-trip propagation loss of a radiated electric wave from the transmission leaking cable to the object. At this time, the radiation angle of the leaking cable is considered.

In this case, a case where the radiation angle is set to 90°.

The one-way transmission loss with the distance X in the cable direction is represented as follows.

$$Lc1 = 10^{(L0 \cdot \frac{X}{10})}$$

$$Lc2 = 10^{(L0 \cdot \frac{L-X}{10})}$$

Here, L0 represents the transmission loss per 1 m (unit dB).

The one-way propagation loss with the distance Y in the separation direction is represented as follows.

$$Lp = \frac{Gt}{2\pi Y}$$

Here, Gt represents the antenna gain (coupling loss) of the leaking cable.

As described in the first embodiment, T1 and T2 can be calculated from X and Y according to the equations (4) and (5), and the following values may be set in the table of (T1, T2).

$$G1 = Lc1^2 \times Lp^2$$

$$G2 = Lc2^2 \times Lp^2$$

Here, the scattering level will be described. The scattering level varies in accordance with the material or shape of the object. When the object is formed of material which easily reflects an electric wave such as metal or the like, the scattering level increases. Furthermore, the scattering level is basically substantially proportional to the size of the object, so that the determination based on the scattering level is substantially equivalent to the determination of the object size.

The calculation of the speed will be described.

The reception signal from an object suffers Doppler shift due to movement of the object.

This Doppler shift is observed as the rotation as described with reference to FIG. 6, and thus the frequency of this rotation is determined by Fourier transform.

When this rotational frequency is represented by ΔF and the observation wavelength is represented by L, it is calculated according to the following equations.

$$V = -\Delta F \times L \div 2$$

As described above, according to the fourth embodiment, the scattering level of the object can be calculated by multiplying the observed variation amount by the numerical values G1 and G2 which are set in accordance with the combination of the propagation delay times T1 and T2. Therefore, the presence or absence of warning can be controlled on the basis of the object scattering level, and thus needless warning based on a small animal or a very large size object such as a truck or the like can be canceled.

Furthermore, the scattering level range can be varied in accordance with the coordinate of the object. Therefore, an alarm is sounded when a large-size object enters a specific area.

Still furthermore, the presence or absence of warning can be controlled in accordance with the speed of the object. For example, the system may be configured to react only when a high-speed object passes. Or, an alarm may be sounded when an object stands still in a specific area.

Fifth Embodiment

Figure 17:
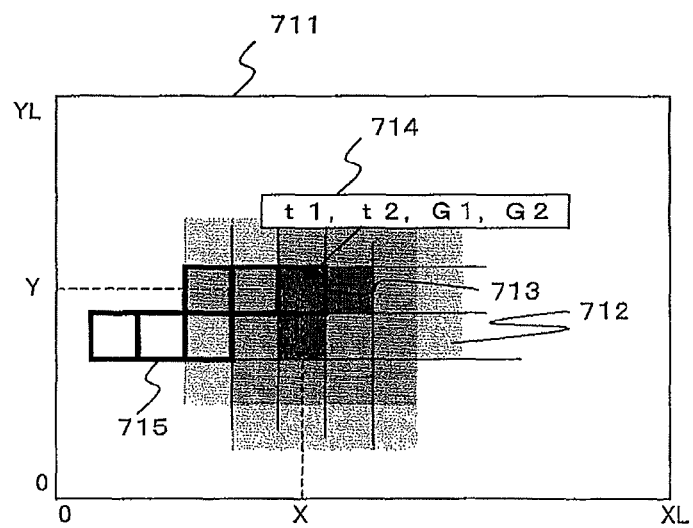
FIG. 17 is a diagram showing a fifth embodiment of the present invention, and also shows an example of the operation of a map collating unit.

FIG. 17 is a diagram showing a fifth embodiment.

In the first to fourth embodiments, each object is individually extracted and the coordinate, etc. of the object are extracted to perform the determination. However, in the fifth embodiment, a two-dimensional electric field state of the whole area of a preset observation region is observed.

FIG. 17 is a diagram showing the operation of the map collator 402.

In FIG. 17, reference numeral 711 represents a two-dimensional arrangement table.

Reference numeral 712 represents an element of the table 711, and t1, t2, G1 and G2 are set in each element.

Figure 18:
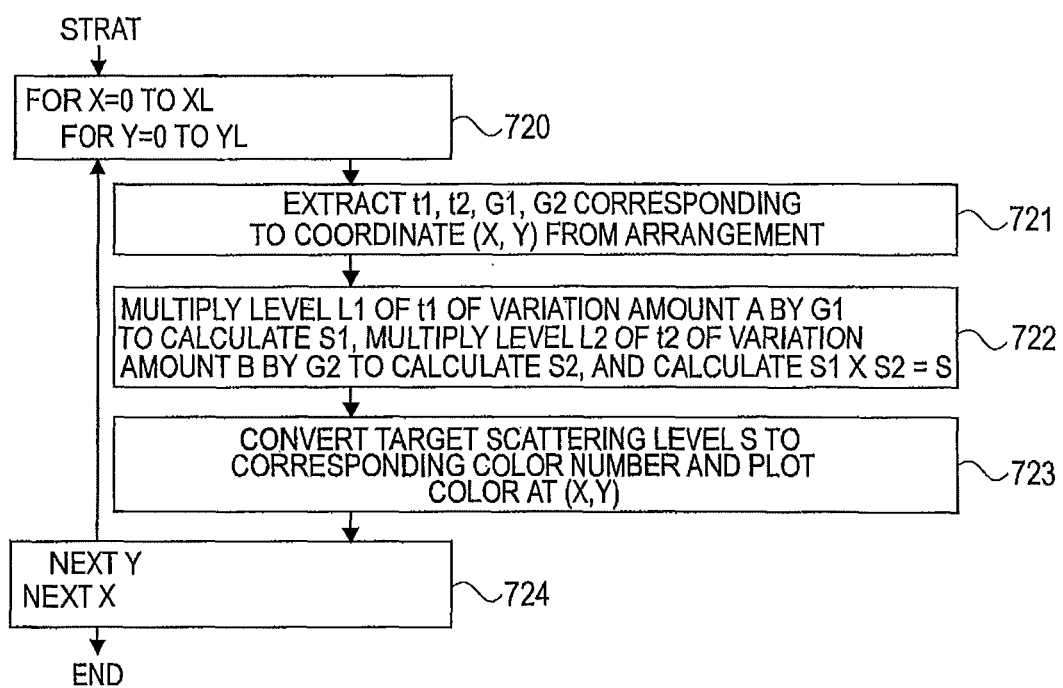
FIG. 18 is a diagram showing an example of the operation flow of the map collating unit in the fifth embodiment of the present invention.

FIG. 18 shows an operation flow of the map collator 402.

Step 720 contains an FOR sentence for shifting X from 0 to XL, and an FOR sentence for shifting Y from 0 to YL. That is, this step scans the range of XL in the lateral direction and YL in the longitudinal direction.

Step 721 extracts t1, t2, G1 and G2 corresponding to the coordinates X, Y from the table 711.

In step 722, the level L1 of t1 of the variation amount A is multiplied by G1 to calculate S1, the level L2 of t2 of the variation amount B is multiplied by G2 to calculate S2, and the object scattering level product S=S1×S2 is calculated.

In step 723, the object scattering level product S is converted to a color number on the basis of a preset color conversion table. This color is plotted at the coordinates X, Y on the screen.

In step 724, the processing returns to the step 720 until scan is completed.

White is allocated to a small object scattering level S, and black is allocated to a large object scattering level S. For an object scattering level between the small and large levels, the color thereof is linearly varied like white→gray→black. In this case, an area where no object exists is white, and a coordinate at which an object exists is black.

Reference numeral 713 of FIG. 17 represents a peak point of the object scattering level S which is displayed with purple color, for example.

When this peak point is set to remain on the screen, a two-dimensional locus caused by movement of an object appears. Reference numeral 715 represents a past peak point, and a movement locus of the object remains.

The coordinate of this peak point is output as an object coordinate to the determining part 403.

Here, in the fifth embodiment, the product of the object scattering level is calculated for a given object coordinate. This calculates the existence probability of the object, that is, the likelihood. That is, the object coordinate is determined on the basis of the maximum likelihood estimation. The maximum likelihood estimation is a high-precision estimating method, and thus the object coordinate can be accurately determined.

The method of setting G1 and G2 is the same as described in the fourth embodiment, and the equations (4) and (5) described in the first embodiment may be used for t1 and t2.

Here, when the leaking cable is not linear, t1 and t2 may be determined by an actual measurement. When there is reflection from a surrounding object, G1 and G2 may be properly corrected by an actual measurement.

As described above, according to the fifth embodiment, the range of the XL in the lateral direction and YL in the longitudinal direction is scanned, and the variation amount is expressed by a color, so that the electric field state of the overall range can be observed.

Furthermore, the peak point of the object scattering level product S is represented by another color, and the locus thereof is left, so that the moving locus of the object can be known.

The object coordinate is measured in terms of likelihood, and thus the object coordinate can be accurately determined.

Even when the leaking cable is not linear, the two-dimensional position of the object and the scattering level of the object can be accurately determined.

Since the electric wave state can be observed, the fifth embodiment is applicable to state monitoring for detecting falling in a tunnel, a traffic accident, other abnormalities, etc.

Furthermore, the embodiment is applicable to state monitoring of linearly extending areas such as rail locus monitoring for detecting a train on-track state of railroads, detecting crossover troubles, detecting fall from platforms, etc., monitoring of runways in an air port, road conditions, etc.

Sixth Embodiment

Figure 19:
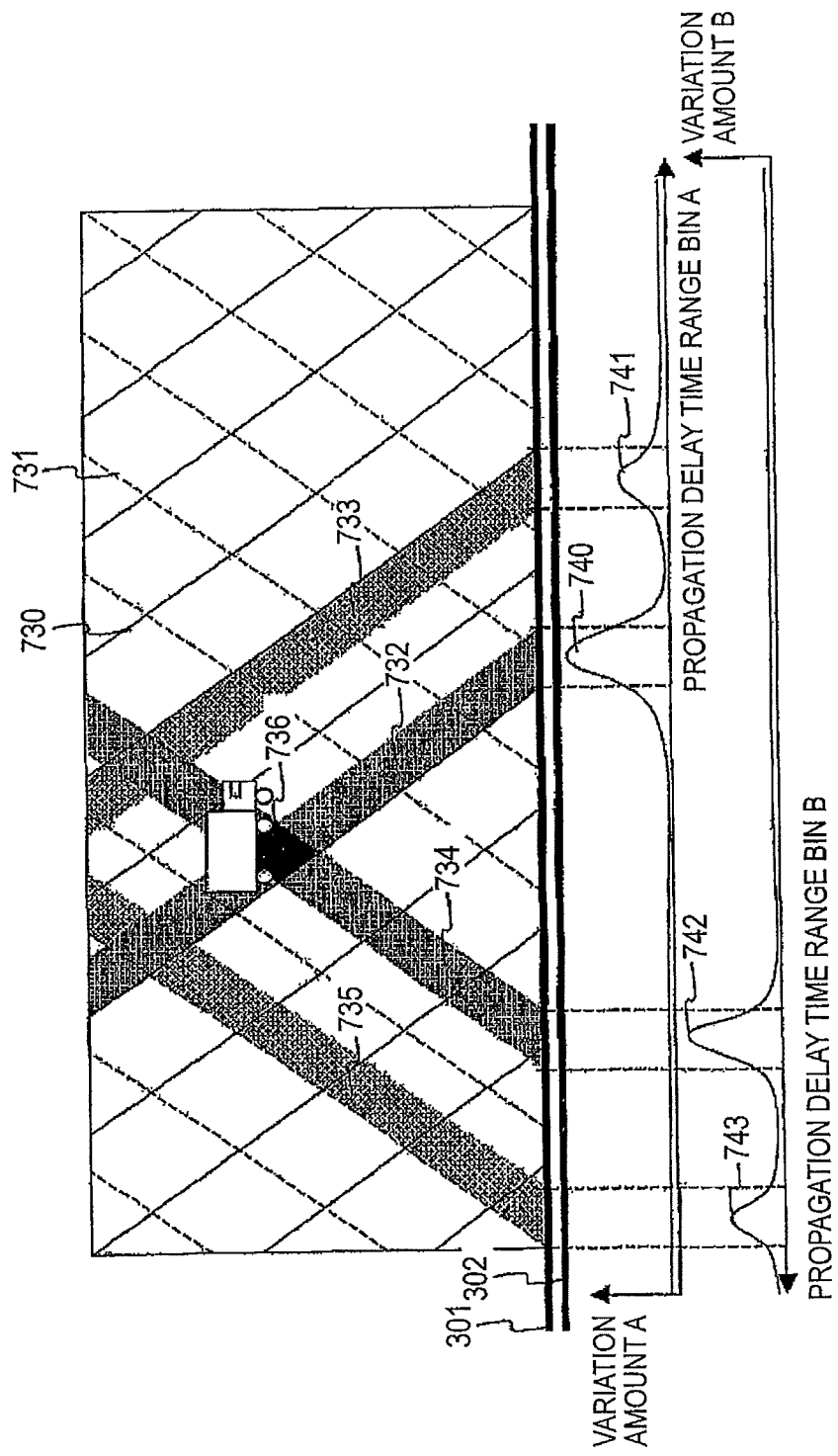
FIG. 19 is a diagram showing a sixth embodiment of the present invention, and shows another example of the operation of the map collating unit.

FIG. 19 is a diagram showing a sixth embodiment.

In this sixth embodiment, the map collator 402 is implemented by another method.

In FIG. 19, reference numerals 730 (solid line) and 731 (broken line) represent isochrones A and B.

The isochrone means that when objects exist on this line, all the objects are observed with the same propagation delay time.

The isochrone A730 corresponds to the propagation delay time range bin A, and the isochrone B731 corresponds to the propagation delay time range bin B.

Here, it is assumed that a reflection wave from an object is secondarily reflected from a nearby reflection body such as a building or the like.

Reference numeral 740 represents an electric field variation caused by an object of an amplitude variation waveform A, and reference numeral 741 represents the secondary reflection component thereof. Reference numeral 742 represents an electric field variation caused by an object of an amplitude variation waveform B, and reference numeral 743 represents the secondary reflection component thereof.

The magnitude of the variation amount of this waveform is plotted on the isochrone corresponding to the propagation delay time. Reference numeral 732 represents a plot result of the amplitude variation waveform 740 on the isochrone, and reference numeral 733 represents a plot result of the amplitude variation waveform 741 on the isochrone. Likewise, reference numeral 734 represents a plot result of the waveform 742 on the isochrone, and reference numeral 735 represents a plot result of the waveform 743 on the isochrone. In FIG. 19, the waveform is converted to a color and then plotted. However, it may be plotted on a two-dimensional arrangement.

Here, when plotting is executed, a multiplication value with a before-plotting value is plotted.

As described above, the amplitude variation waveform A and the amplitude variation waveform B are overlapped with each other. The overlapping is executed by multiplication, and thus the multiplication value becomes the existence probability (likelihood).

The secondary reflection component is observed as being delayed with respect to the object at all times, and the level thereof is low. Accordingly, when the amplitude variation waveform A and the amplitude variation waveform B are overlapped with each other, the existence probability of the reference numeral 736 which corresponds to the overlap between the objects is highest.

Here, the plot position is determined by the isochrones A and B, and the isochrones A and B are represented according to the equations (1) to (5) described in the first embodiment as follows.

$$\text{Isochrone } A \quad Y = \frac{c\left(\frac{T1}{2} - \frac{x}{K \cdot c}\right)}{\left(\frac{\tan(\theta 1)}{K} + \frac{1}{\cos(\theta 1)}\right)} \quad (7)$$

$$\text{Isochrone } B \quad Y = \frac{c\left(\frac{T2}{2} - \frac{L-x}{K \cdot c}\right)}{\left(\frac{\tan(\theta 2)}{K} + \frac{1}{\cos(\theta 2)}\right)} \quad (8)$$

In the sixth embodiment using the isochrone, the table 711 is not required as in the case of the fifth embodiment, and the plot position is determined by a mathematical function, so that the memory amount can be reduced.

Furthermore, only the peak points of the amplitude variation waveform A and the amplitude variation waveform B may be plotted, and thus the processing speed can be increased.

Seventh Embodiment

FIG. 20 is a diagram showing a seventh embodiment.

In FIG. 20, reference numeral 801 represents the ground surface, reference numerals 301 and 302 represent leaking cables, reference numeral 802 represents a shielding plate, reference numeral 803 represents an observation area when the shielding plate 802 is not provided, reference numeral 804 represents an observation area when the shielding plate 802 is provided, and reference numeral 805 represents a support pole.

The support pole 805 supports the leaking cables 301 and 302.

When the shielding plate 802 is not provided, the two-dimensional position of the object is observed over the overall observation area 803. Therefore, it is not discriminated whether the object is located at the right side or at the left side in FIG. 20. Therefore, the shielding plate 802 is disposed in the neighborhood of the leaking cables.

With this arrangement, the two-dimensional position of the object is observed in the observing area 804, and only the left side in FIG. 20 is set as the observation area.

The same is applied to a case where the leaking cables are arranged in the vertical direction by using the support pole 805.

Here, the shielding plate 802 is formed of a material which does not pass any electric wave therethrough. For example, a metal plate, a metal fence, a concrete wall or the like may be used as the shielding plate 802.

As described above, according to the seventh embodiment, the observing area is limited by the shielding plate, and uncertainty as to the right side or the left side with respect to the object position can be avoided, and thus the position can be accurately measured.

The technical features of the first to seventh embodiments described above are listed below.

Feature 1: an object detecting and state monitoring device is characterized in that a first transmission signal is input from one connection point of a linear leaking transmitting unit; a first reception signal including a first electric wave obtained by radiating the first transmission signal from the linear linking transmitting unit and a first reflection wave obtained by reflecting the first electric wave from an object is observed at the same connection point as an input side for the first transmission signal of a linear leaking receiving unit which is laid on substantially in parallel to the above linear leaking transmitting unit; a second transmission signal is input from the other connection point at the opposite side of the linear linking transmitting unit; a second reception signal including a second electric wave obtained by radiating the second transmission signal from the linear leaking transmitting unit and a second reflection wave obtained by reflecting the second electric wave from the object is observed as the same connection point as an input side for the second transmission signal of the linear leaking receiving unit; and the two-dimensional position of the object is measured by using the first reception signal and the second reception signal.

Feature 2: in the object detecting and state monitoring device of the feature 1, the first transmission signal and the second transmission signal are alternately output time-divisionally, and the first reception signal and the second reception signal are observed time-divisionally.

Feature 3: An object detecting and state monitoring device is characterized in that first transmission signal is input from one connection point of a linear leaking transmitting unit connected to an amplification terminating unit (amplification terminal) at the opposite side; a first reception signal including a first electric wave obtained by radiating the first transmission signal from the linear leaking transmitting unit and a first reflection wave obtained by reflecting the first electric wave from an object is observed at the same connection point as an input side for the first transmission signal of the linear leaking receiving unit connecting the amplification terminating unit at the opposite side which is laid on substantially in parallel to the linear leaking transmission signal; and the first reception signal is divided into two time areas on the basis of a propagation delay time, and the two-dimensional position of the object is measured by using the signals of the two time areas.

Feature 4: in the object detecting and state monitoring device of the feature 3, a short-circuited terminating unit (short-circuited terminal) is connected in place of the amplification terminating unit.

Feature 5: in the object detecting and state monitoring device of any one of the features 1 to 4, the reception signal is analyzed on the basis of a correction value corresponding to the two-dimensional position of the object position, and a scattering level of the object is measured.

Feature 6: in the object detecting and state monitoring device described in anyone of the features 1 to 5, an existence probability of the object on a two-dimensional plane is calculated.

Feature 7: in the object detecting and state monitoring device described in the feature 6, a moving locus of the object is left.

Feature 8: in the object detecting and state monitoring device described in any one of the features 1 to 5, the two-dimensional position of the object is measured according to a preset isochrone.

Feature 9: in the object detecting and state monitoring device described in any one of the features 1 to 4, a shielding plate is disposed in the neighborhood of the linear leaking transmitting unit or the linear leaking receiving unit.

Feature 10: in the object detecting and state monitoring device described in any one of the features 1 to 9, on the basis of the measured position on the two-dimensional plane of the object and a predetermined threshold value for the scattering level of the object, it is determined whether an alarm is issued or not.

Feature 11: a device and a method used to detect invasion or monitor passage of an object is characterized in that the two-dimensional position of an invading object or passing object is measured to determine a moving locus of the object by using a leaking cable disposed along the monitoring region, and an alarm is output in accordance with a predetermined threshold value.

Feature 12: a system is characterized in that a two-dimensional position containing a separation distance of an object from a leaking cable is measured to enable the two-dimensional position to be used as an index for determining a warning, and a warning can be prevented from being improperly given with respect to a remote object.

Feature 13: a method of measuring a scattering level of an object which is roughly proportional to the size of the object is provided.

Accordingly, the size of the object can be used as an index for warning, and a warning can be prevented from being improperly given with respect to a small object.

Feature 14: a monitoring system for a moving object is characterized by including a leaking transmission device having a first and second leaking transmission paths extending substantially in parallel to each other; first equipment for transmitting a first transmission signal from one end side of both the ends of the leaking transmission device as a transmission medium to the other end side; second equipment for transmitting a second transmission signal from the other end side of both the ends of the leaking transmission device as the transmission medium to the one end side; and a detector for detecting a two-dimensional movement of a moving object as a monitoring target on the basis of a difference between variation of a first reception signal and variation of a second reception signal, wherein the first transmission signal is radiated as a first electric wave from one of the first and second leaking transmission paths, the first electric wave is reflected from the moving object as the monitoring target to obtain a first reflection electric wave, and the first reflection electric wave is received through the leaking transmission device to obtain the first reception signal while the second transmission signal is radiated as a second electric wave from one of the first and second leaking transmission paths, the second electric wave is reflected from the moving object as the monitoring target to obtain a second reflection electric wave, and the second reflection electric wave is received through the leaking transmission device to obtain the second reception signal.

Feature 15: in the moving object monitoring system of the feature 14, both the first equipment and the second equipment have a function for generating a transmission signal.

Feature 16: in the monitoring system described in the feature 14, the first equipment has a function of generating a transmission signal, and the second equipment has a function of amplifying a reflection wave of the transmission signal transmitted from the first equipment and transmitting the amplified reflection wave as the second transmission signal.

Feature 17: a monitoring system for a moving object is characterized in that a first transmission signal is input from one side of both the ends of a first leaking transmission path, a firs reception signal including a first electric wave obtained by radiating the first transmission signal from the first leaking transmission path and a first reflection wave obtained by reflecting the first electric wave from a moving object as a monitoring target is observed as an input side for the first transmission signal of a second leaking transmission path which is laid on substantially in parallel to the first leaking transmission path, a second transmission signal is input from the other side of both the ends of the first leaking transmission path, a second reception signal including a second electric wave obtained by radiating the second transmission signal from the first leaking transmission path and a second reflection wave obtained by reflecting the second electric wave from the object as the monitoring target is observed at the same side as an input side for the second transmission signal of the second leaking transmission path, and the two-dimensional position of the moving object as the monitoring target is measured by using the first reception signal and the second reception signal in a detector.

Feature 18: in the moving object monitoring system described in any one of the features 14 to 17, the first transmission signal and the second transmission signal are alternately output time-divisionally, and the first reception signal and the second reception signal are time-divisionally observed.

Feature 19: a monitoring system for a moving object is characterized in that a first transmission signal is input from one side of a first leaking transmission path connected to an amplification terminating unit at the other end thereof, a first reception signal including a first electric wave obtained by radiating the first transmission signal from the first leaking transmission path and a first reflection wave obtained by reflecting the first electric wave from a moving object as a monitoring target is observed at the same side as an input side for the first transmission signal of a second leaking transmission path which is laid on substantially in parallel to the first leaking transmission path and connected to an amplification terminating unit at one side of both the ends thereof, the first reception signal is divided into two time areas on the basis of a propagation delay time, and the two-dimensional position of the moving object as the monitoring target is measured by using signals of the two time areas in a detector.

Feature 20: in the monitoring system for the moving object described in the feature 19, a short-circuited terminating unit (terminal) is connected in place of the amplification terminating unit (terminal).

Feature 21: in the moving object monitoring system described in any one of the features 14 to 20, the reception signal is analyzed based on a correction value corresponding to the two-dimensional position of the moving object, and a scattering level of the moving object is measured.

Feature 22: in the moving object monitoring system described in any one of the features 14 to 21, an existence probability of the object on the two-dimensional plane is calculated.

Feature 23: in the moving object monitoring system described in the feature 22, a moving locus of the moving object is left.

Feature 24: in the moving object monitoring system described in any one of the features 14 to 21, the two-dimensional position of the moving object is measured according to a preset isochrone.

Feature 25: in the moving object monitoring system described in any one of the features 14 to 24, a shielding plate is disposed in the neighborhood of at least one of the first and second leaking transmission paths.

Feature 26: in the moving object monitoring system described in any one of the features 14 to 25, on the basis of the measured position on the two-dimensional plane of the moving object and the predetermined threshold value for the scattering level of the moving object, it is determined whether an alarm is issued or not.

In FIGS. 1 to 20, the same reference numerals represent the same or corresponding parts.

Various modifications and alterations of this invention will be apparent to those skilled in the art without departing from the scope and spirit of this invention, and it should be understood that this is not limited to the illustrative embodiments set forth herein.

What is claimed is:

1. A monitoring system for a moving object, comprising:
a leaking transmission device having a first and second leaking transmission paths extending substantially in parallel to each other;
first equipment for transmitting a first transmission signal from one end side of both the ends of the leaking transmission device as a transmission medium to the other end side;
second equipment for transmitting a second transmission signal from the other end side of both the ends of the leaking transmission device as the transmission medium to the one end side; and
a detector for detecting a two-dimensional movement of a moving object as a monitoring target on the basis of a difference between variation of a first reception signal and variation of a second reception signal, wherein the first transmission signal is radiated as a first electric wave from one of the first and second leaking transmission paths, the first electric wave is reflected from the moving object as the monitoring target to obtain a first reflection electric wave, and the first reflection electric wave is received through the leaking transmission device, thereby obtaining the first reception signal while the second transmission signal is radiated as a second electric wave from one of the first and second leaking transmission paths, the second electric wave is reflected from the moving object as the monitoring target to obtain a second reflection electric wave, and the second reflection electric wave is received through the leaking transmission device, thereby obtaining the second reception signal.

2. The moving object monitoring system according to claim 1, wherein both the first equipment and the second equipment have a function for generating a transmission signal.

3. The moving object monitoring system according to claim 1, wherein the first equipment has a function of generating a transmission signal, and the second equipment has a function of amplifying a reflection wave of the transmission signal transmitted from the first equipment and transmitting the amplified reflection wave as the second transmission signal.

4. The moving object monitoring system according to claim 1, wherein the first transmission signal and the second transmission signal are alternately output time-divisionally, and the first reception signal and the second reception signal are time-divisionally observed.

5. The moving object monitoring system according to claim 1, wherein the reception signal is analyzed based on a correction value corresponding to the two-dimensional position of the moving object, and a scattering level of the moving object is measured.

6. The moving object monitoring system according to claim 1, wherein an existence probability of the object on the two-dimensional plane is calculated.

7. The moving object monitoring system according to claim 6, wherein a moving locus of the moving object is left.

8. The moving object monitoring system according to claim 1, wherein the two-dimensional position of the moving object is measured according to a preset isochrone.

9. The moving object monitoring system according to claim 1, further comprising a shielding plate disposed in the neighborhood of at least one of the first and second leaking transmission paths.

10. The moving object monitoring system according to claim 1, wherein on the basis of the measured position on the two-dimensional plane of the moving object and the predetermined threshold value for the scattering level of the moving object, it is determined whether an alarm is issued or not.

11. A monitoring system for a moving object, wherein a first transmission signal is input from one side of both the ends of a first leaking transmission path, a first reception signal including a first electric wave obtained by radiating the first transmission signal from the first leaking transmission path and a first reflection wave obtained by reflecting the first electric wave from a moving object as a monitoring target is observed at an input side for the first transmission signal of a second leaking transmission path which is laid on substantially in parallel to the first leaking transmission path, a second transmission signal is input from the other side of both the ends of the first leaking transmission path, a second reception signal including a second electric wave obtained by radiating the second transmission signal form the first leaking transmission path and a second reflection wave obtained by reflecting the second electric wave from the object as the monitoring target is observed at the same side as an input side for the second transmission signal of the second leaking transmission path, and the two-dimensional position of the moving object as the monitoring target is measured by using the first reception signal and the second reception signal in a detector on the basis of a difference between variation of a first reception signal and variation of a second reception signal.

12. The moving object monitoring system according to claim 11, wherein the first transmission signal and the second transmission signal are alternately output time-divisionally, and the first reception signal and the second reception signal are time-divisionally observed.

13. A monitoring system for a moving object according to claim 11, wherein the first transmission signal is further connected to an amplification terminating unit at one side of both the ends thereof, the first reception signal is divided into two time areas on the basis of a propagation delay time, and the two-dimensional position of the moving object as the monitoring target is measured by using signals of the two time areas in a detector.

14. The monitoring system for the moving object according to claim 11, wherein a short-circuited terminating unit (terminal) is connected in place of the amplification terminating unit.

15. The moving object monitoring system according to claim 14, wherein the reception signal is analyzed based on a correction value corresponding to the two-dimensional position of the moving object, and a scattering level of the moving object is measured.

16. The moving object monitoring system according to claim 15, wherein an existence probability of the object on the two-dimensional plane is calculated.

17. The moving object monitoring system according to claim 16, wherein a moving locus of the moving object is left.

18. The moving object monitoring system according to claim 15, wherein the two-dimensional position of the moving object is measured according to a preset isochrone.

19. The moving object monitoring system according to claim 18, further comprising a shielding plate disposed in the neighborhood of at least one of the first and second leaking transmission paths.

20. The moving object monitoring system according to claim 19, wherein on the basis of the measured position on the two-dimensional plane of the moving object and the predetermined threshold value for the scattering level of the moving object, it is determined whether an alarm is issued or not.

* * * * *